(12) United States Patent
Beaumont

(10) Patent No.: US 11,077,456 B2
(45) Date of Patent: *Aug. 3, 2021

(54) REAL-TIME LASER MEASUREMENT AND MARKING APPARATUS

(71) Applicant: Tom Beaumont, New York, NY (US)

(72) Inventor: Tom Beaumont, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/947,332

(22) Filed: Jul. 28, 2020

(65) Prior Publication Data

US 2020/0353492 A1 Nov. 12, 2020

Related U.S. Application Data

(63) Continuation-in-part of application No. 16/510,866, filed on Jul. 12, 2019, now Pat. No. 10,722,770.

(Continued)

(51) Int. Cl.
*B05C 17/005* (2006.01)
*E01C 23/22* (2006.01)
(Continued)

(52) U.S. Cl.
CPC .......... *B05B 12/124* (2013.01); *B05B 12/004* (2013.01); *B05C 17/00506* (2013.01);
(Continued)

(58) Field of Classification Search
CPC ....... B05B 13/00; B05B 15/60; E01C 23/166; G05B 2219/37129; G05B 2219/45013; A63B 57/203; A63B 57/353
See application file for complete search history.

(56) References Cited

U.S. PATENT DOCUMENTS 3,254,803 A 6/1966 Meshberg
3,485,206 A * 12/1969 Smrt .................... E01C 23/227
118/305

(Continued)

FOREIGN PATENT DOCUMENTS

EP 0470181 B1 2/1992
WO 2020014694 A1 1/2020

OTHER PUBLICATIONS

U.S. Non-Final Office Action dated Oct. 18, 2019 cited in U.S. Appl. No. 16/510,866, 14 pgs.

(Continued)

*Primary Examiner* — Karl Kurple
(74) *Attorney, Agent, or Firm* — Gibraltar Consulting LLC; Tariq S. Najee-ullah

(57) ABSTRACT

A real-time measurement and marking apparatus is provided. The disclosure providing a portable marking device comprising: a housing including a main housing structure and a can cover, the main housing structure having a front open end, a rear nozzle end, a top surface, a bottom surface, and a pair of opposing side walls, wherein at least one of the side walls defines an aperture, the can cover having a rear open end, a front closed end, the can cover extending at the rear open end to selectively engage with the aperture defined by at least one of the side walls releasably securing a spray can within the housing; a nozzle member positioned at the rear nozzle end of the of the main housing structure; an optical measuring apparatus for real-time measuring of a distance between a point of focus and the portable marking device activated by one or more buttons.

20 Claims, 17 Drawing Sheets

Related U.S. Application Data

(60) Provisional application No. 62/696,902, filed on Jul. 12, 2018.

(51) Int. Cl.

| | |
|---|---|
| *B05B 16/60* | (2018.01) |
| *B05B 12/12* | (2006.01) |
| *B65D 83/14* | (2006.01) |
| *B05B 12/00* | (2018.01) |
| *G01C 3/08* | (2006.01) |
| *G01C 3/00* | (2006.01) |
| *B65D 83/38* | (2006.01) |
| *B05B 15/62* | (2018.01) |
| *A63C 19/06* | (2006.01) |

(52) U.S. Cl.
CPC .......... *B65D 83/384* (2013.01); *B65D 83/75* (2013.01); *G01C 3/00* (2013.01); *G01C 3/08* (2013.01); *A63C 2019/067* (2013.01); *B05B 15/62* (2018.02); *B05B 16/60* (2018.02); *B65D 83/38* (2013.01); *B65D 83/386* (2013.01); *E01C 23/22* (2013.01); *E01C 23/222* (2013.01); *E01C 23/227* (2013.01)

(56) References Cited

U.S. PATENT DOCUMENTS

| | | | |
|---|---|---|---|
| 3,985,356 A | 10/1976 | Carlock | |
| 4,099,482 A * | 7/1978 | Smrt | B65D 83/203 |
| | | | 118/305 |
| 5,186,119 A | 2/1993 | Hlavin | |
| 5,862,960 A * | 1/1999 | Miller | B65D 83/384 |
| | | | 222/325 |
| 5,868,840 A | 2/1999 | Klein, II et al. | |
| 5,918,565 A * | 7/1999 | Casas | G01C 15/02 |
| | | | 116/209 |
| 6,227,989 B1 | 5/2001 | Reid | |
| 6,283,334 B1 * | 9/2001 | Mahaffey | A45F 5/02 |
| | | | 222/175 |
| 6,294,022 B1 | 9/2001 | Eslambolchi | |
| 6,419,122 B1 * | 7/2002 | Chown | A01M 1/2044 |
| | | | 222/162 |
| 6,976,928 B2 | 12/2005 | Hemphill | |
| 7,296,713 B2 * | 11/2007 | Mineau | B65D 83/203 |
| | | | 222/182 |
| 7,443,154 B1 * | 10/2008 | Merewether | G01V 3/08 |
| | | | 324/67 |
| 7,798,922 B2 | 9/2010 | Oresky | |
| 8,070,630 B2 | 12/2011 | Minarovic | |
| 8,556,122 B2 | 10/2013 | Helf | |
| 8,590,743 B2 | 11/2013 | Beland | |
| 8,713,808 B2 | 5/2014 | Amron | |
| 9,046,413 B2 | 6/2015 | Nielsen | |
| 9,144,729 B2 | 9/2015 | Foster | |
| 9,433,849 B1 | 9/2016 | Brown | |
| 9,731,308 B1 * | 8/2017 | Conrad, Jr. | B05D 1/02 |
| 2002/0165046 A1 | 11/2002 | Helber | |
| 2005/0137829 A1 | 6/2005 | Gimelfarb et al. | |
| 2005/0214444 A1 * | 9/2005 | Robens | B05B 9/0861 |
| | | | 427/8 |
| 2006/0023199 A1 | 2/2006 | Stierle et al. | |
| 2006/0118578 A1 * | 6/2006 | Mineau | B65D 83/203 |
| | | | 222/182 |
| 2007/0017933 A1 * | 1/2007 | Gaillen | B65D 83/386 |
| | | | 222/162 |
| 2007/0032317 A1 | 2/2007 | Frederick | |
| 2010/0006667 A1 | 1/2010 | Nielsen et al. | |
| 2010/0096477 A1 | 4/2010 | Klein, II et al. | |
| 2010/0133261 A1 | 6/2010 | Schildt | |
| 2010/0137077 A1 | 6/2010 | Petela | |
| 2010/0272885 A1 * | 10/2010 | Olsson | B65D 83/36 |
| | | | 427/137 |
| 2011/0045175 A1 | 2/2011 | Nielsen et al. | |
| 2011/0117272 A1 | 5/2011 | Nielsen et al. | |
| 2011/0191058 A1 * | 8/2011 | Nielsen | G01V 3/38 |
| | | | 702/130 |
| 2012/0111890 A1 * | 5/2012 | Herring | A47K 5/12 |
| | | | 222/180 |
| 2013/0092759 A1 * | 4/2013 | Kaufman | B65D 83/40 |
| | | | 239/288.3 |
| 2013/0122186 A1 | 5/2013 | Hoppel | |
| 2013/0229641 A1 | 9/2013 | Wolst et al. | |
| 2013/0276205 A1 | 10/2013 | Madore et al. | |
| 2014/0048666 A1 * | 2/2014 | Waldren | B65D 23/003 |
| | | | 248/231.91 |
| 2015/0182825 A1 | 7/2015 | O'Connor et al. | |
| 2017/0057081 A1 | 3/2017 | Krohne et al. | |
| 2017/0252760 A1 | 9/2017 | Campbell | |
| 2017/0259988 A1 * | 9/2017 | Carrette | A63C 19/06 |
| 2017/0334189 A1 * | 11/2017 | Nam | B41J 3/407 |
| 2019/0145798 A1 | 5/2019 | Kamiya et al. | |

OTHER PUBLICATIONS

International Search Report and Written Opinion dated Nov. 25, 2019 cited in Application No. PCT/US19/41736, 13 pgs.

* cited by examiner

US 11,077,456 B2

REAL-TIME LASER MEASUREMENT AND MARKING APPARATUS

RELATED APPLICATIONS

This application is a Continuation-In-Part of U.S. application Ser. No. 16/510,866 filed Jul. 12, 2019, which issues on Jul. 28, 2020 as U.S. Pat. No. 10,722,770, which claims priority to U.S. Provisional Application No. 62/696,902 filed Jul. 12, 2018, which are hereby incorporated by reference herein in its entirety.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure relates to measuring arrangements, position detection, or surveying characterized by the use of optical means. Moreover, the present disclosure relates to a spraying apparatus for discharge of liquids or dispensing contents configured for marking a surface. The present disclosure may be related to at least the Cooperative Patent Classifications G01B11/00, G01B9/00, G01C15/00, B21B38/00, B21B37/00, G01N27/00, G01N21/00, B05B7/00, C09D5/00.

BACKGROUND OF THE DISCLOSURE

The sports industry is a very lucrative business internationally. The sports market in North America was worth $60.5 billion in 2014. It is expected to reach $73.4 billion by 2019. One of the biggest reasons for growth is the projected revenue increases derived from media rights deals in conjunction with gate revenues. Over $3.2 billion was wagered in sports bets in Las Vegas casinos in 2011 with $1.34 billion wagered on American football. The Premier League (English/Welsh football league, i.e., soccer) is a $5.3 billion business. The National Football League (American Style Football) is a $13 billion business. The WORLD CUP® is predicted to have a total economic impact of $30.8 billion by 2023.

With sporting fans, players, sporting clubs, companies, and sponsors investing such tremendous funds, time and resources in the global sports industry, there is an expectation that the quality of the sporting product to have the highest level of integrity. One manner to ensure this is to make sure that the officiating be precise and completely fair in sporting contests. Corruption has always been a factor when dealing with professional sports from the American Baseball Black Sox Scandal, to fixed Cricket matches, to basketball point shaving scandals, to most prominently in Association Football match fixing. Despite this, there remains a high commitment from league officials to maintain the highest standard of integrity with sports.

However, recently, there have been a surge of international scandals and allegations regarding match fixing, referee corruption, illegal sports gambling, and player collusion relating to professional sports. For example, FIFA® independent ethics committee has been probing numerous cases of suspected corruption while serving lifetime bans from the sport of football (soccer) for corrupt officials found guilty. American football quarterback, Tom Brady, was suspended by the League for four games in 2016, for instructing team staff to deflate his footballs below the required level so that he would have an illegal advantage over his opponent, incidents like this are unacceptable in the world of sports.

In addition to avoiding this type of corruption, it is also preferable to provide methods and systems to avoid unintentionally providing an advantage for one opponent over another opponent by imprecise officiating. One manner of maintaining a high level of sports integrity, it is necessary to regulate sports officiating. What is necessary is tools to provide an improved means and methods for more accurate officiating in professional sports.

In some sporting situations, it may be necessary to quickly determine precise measurements. For example, a game official may need to determine the proper yardage after a play, measure the distance of a game ball, player, or game object from a particular location on the field of play. The official may further need to mark the location on the field. Thus, the conventional strategy is to have game officials quickly approximate this distance so that game play may continue. This often causes problems because the conventional strategy does not provide for precise or accurate real-time measurement. For example, imprecise measurement may unfairly advantage one team over another team.

Accordingly, there remains a need for improved means and methods for precision real-time measurement. This need and other needs are satisfied by the various aspects of the present disclosure.

SUMMARY OF THE DISCLOSURE

In accordance with the purposes of the disclosure, as embodied and broadly described herein, the disclosure, in one aspect, relates to real-time measurement and marking apparatus, such as, for example providing a precision distance measuring tool. In further aspects, a real-time measurement and marking apparatus is provided. In another aspect, the disclosure relates to the real-time measurement and marking apparatus. The real-time measurement and marking apparatus solves the problem that is caused by the failure of officials to accurately measure distances during sporting contests. For example, during football (soccer) matches, officials rarely accurately measure the ten-yard distance between a soccer ball and the defensive line for placement of a free kick. This disclosure provides a precision measurement tool to overcome these shortcomings.

In further aspects, the disclosure also relates to the multiple components of the real-time measurement and marking apparatus in accordance with an embodiment of the present disclosure. The multiple components of real-time measurement and marking apparatus are as follows: the main housing; a power indicator, a laser system, the foam spray can; the universal clip; and the fully assembled real-time measurement and marking apparatus.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are and explanatory only and are not restrictive of the disclosure, as claimed.

BRIEF DESCRIPTION OF THE DRAWINGS

The accompanying drawings, which are incorporated in and constitute a part of this specification, illustrate several aspects of the disclosure and together with the description, serve to explain the principles of the disclosure.

DETAILED DESCRIPTION OF THE DISCLOSURE

Figure 1A:
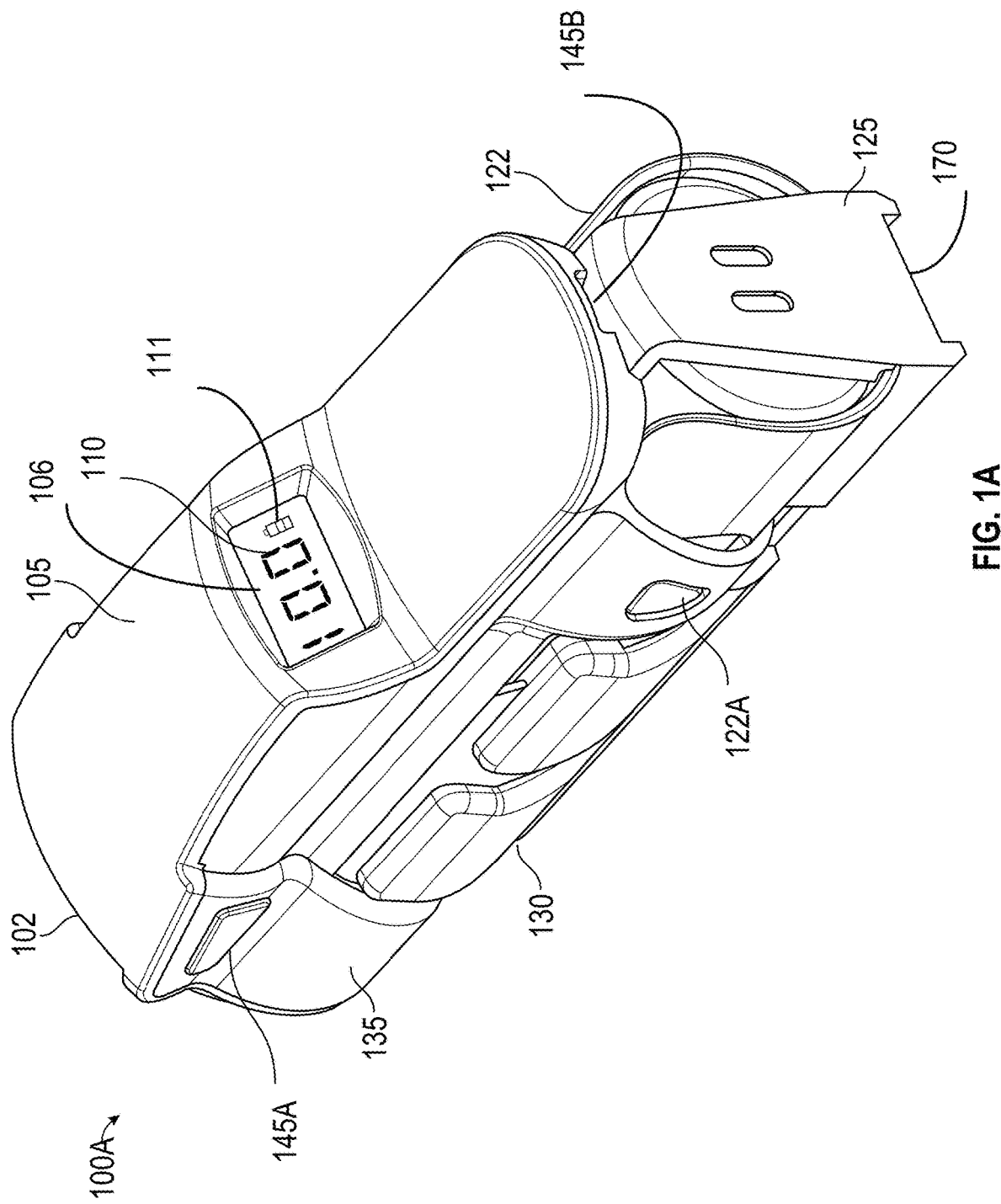
FIGS. 1A and 1B show perspective and isometric views of the real-time measurement and marking apparatus in accordance with an embodiment of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure can be understood more readily by reference to the following detailed description of the disclosure and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the disclosure as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the disclosure. Thus, if there are a variety of additional steps that can be performed it is understood that each of these additional steps can be performed with any specific aspect or combination of aspects of the methods of the disclosure.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

Real-Time Measurement and Marking Apparatus Devices and Systems

As briefly described above, the present disclosure relates, in various aspects, to a real-time measurement and marking apparatus. In one aspect, the present disclosure provides a real-time measurement and marking apparatus to both measure and mark the distance between a soccer game ball and defensive line during a free kick placement by an official. In further aspects, the real-time measurement and marking apparatus is provided for both measuring and marking the precise distance between a game ball and a defender by an official. In still further aspects, the real-time measurement and marking apparatus is configured to measure a distance of ten yards between a game ball and a defensive line. In even further aspects, the real-time measurement and marking apparatus is configured to mark a distance of ten yards between a game ball and a defensive line.

In further aspects, the disclosed the real-time measurement and marking apparatus is configured to mark a distance by using a spray can wherein the spray can maybe at least one of but not limited to an aerosol can, a foam spray can, and the like. In still further aspects, the device can be useful for both measuring and marking precise distance.

In another aspect, the present disclosure provides an apparatus.

An apparatus comprising: an optical measuring means including but not limited to a laser measuring means; a housing including but not limited to a vinyl, plastic, metal, or other housing wherein said housing may be produced by injection molding, three-dimensional printing, and other manufacturing means; a marking component including but not limited to a vanishing spray, a spray paint, a chemical marking substance, a scented marking substance, an unscented marking substance; and a fastener including but not limited to a handle, a grip, a clip, a hook and look fastener, and a fastening means.

The apparatus further comprising wherein the optical measuring means further comprises a precision real-time laser measuring apparatus.

The apparatus further comprising wherein the housing further comprises a main housing constructed from at least one of: plastic, metal, foam, and other like material.

The apparatus further comprising wherein the fastener further comprises a clip assembly such as a universal clip, swivel clip or removable fastener.

The apparatus further comprising wherein the marking component further comprises a spray can.

The apparatus further comprising wherein the spray can further comprise at least one of: a vanishing spray, a vanishing paint, a spray paint, an odorless paint, and a like material.

In another aspect, the present disclosure provides a system for precision real-time laser measurement and marking. A system comprising: a real-time optical measuring apparatus; a housing apparatus; a marking apparatus; and a fastener.

In another aspect, the present disclosure provides a fastener wherein the fastener may be at least one of a universal clip that fastens to a belt; a snapping mechanism, a locking mechanism, and other suitable fastening tools.

In another aspect, the present disclosure provides a portable marking device comprising: a housing including a main housing structure and a can cover, the main housing structure having a front open end, a rear nozzle end, a top surface, a bottom surface, and a pair of opposing side walls, wherein at least one of the side walls defines an aperture, the can cover having a rear open end, a front closed end, at least one portion of the can cover extending at the rear open end to selectively engage with the aperture defined by at least one of the side walls, wherein the can cover is configured to cover a portion of a spray can for releasably securing the spray can within the housing; a nozzle member positioned at the rear nozzle end of the of the main housing structure, the nozzle member having a spray aperture and a spray nozzle button configured to dispense a marking material from a spray can through the spray aperture; an optical measuring apparatus contained within the main housing structure for real-time measuring of a distance between a point of focus and the portable marking device; and a housing guard disposed over the optical measuring apparatus.

In another aspect, the portable marking device of may further comprise a range measurement button disposed on the top surface of the main housing structure for activating real-time measuring by the optical measuring apparatus, and a measurement display screen positioned on a front face of the main housing structure above the range measurement button; and wherein the optical measuring apparatus comprises a range finder disposed on a surface at the rear nozzle end above the nozzle member.

In another aspect, the portable marking device of may further include aspects wherein the portable marking device is configured to perform real-time measuring when a user aims the range finder at the point of focus and activates the optical measuring apparatus to obtain a real-time measurement of distance; and wherein the portable marking device is further configured to display the real-time measurement on the measurement display screen. wherein the optical measuring apparatus is configured to transmit a first laser on the point of focus for obtaining a real-time measurement of the distance to the point of focus.

In yet another aspect, the portable marking device of may further include aspects wherein the optical measuring apparatus is configured to transmit a second laser on the point of focus, wherein the optical measuring apparatus is further configured to determine the real-time measurement based a first measurement of the first laser and a second measurement of the second laser.

In another aspect, the portable marking device of may further include aspects wherein the portable marking device further comprises a universal serial bus port (USB) port and a controller configured to interface with the optical measuring apparatus. In another aspect, the portable marking device of may further include aspects wherein the controller is further configured to perform time tracking, perform data logging, receive user input, and transmit and receive data. In another aspect, the portable marking device of may further include aspects further comprising a memory, a computing device, a transmitter, and a receiver. In yet another aspect, the portable marking device of may further include aspects further comprising a motor electronically coupled to the controller.

In another aspect, the portable marking device of may further include aspects wherein the measurement display screen is further configured to display a power level indicator. In another aspect, the portable marking device of may further include aspects wherein the housing is manufactured from injected molded plastic selected from the group consisting of acrylonitrile butadiene styrene (ABS), polycarbonate alloy (PC), and a combination thereof. In another aspect, the portable marking device of may further include aspects wherein the real-time measurement of distance is within 0.005% accuracy.

In another aspect, the present disclosure may provide for a portable marking device comprising: a housing including a main housing structure and a can cover, the main housing structure having a front open end, a rear nozzle end, a top surface, a bottom surface, and a pair of opposing side walls, wherein at least one of the side walls defines an aperture, the can cover having a rear open end, a front closed end, at least one portion of the can cover extending at the rear open end to selectively engage with the aperture defined by at least one of the side walls, wherein the can cover is configured to cover a portion of a spray can for releasably securing the spray can within the housing; a nozzle member positioned at the rear nozzle end of the of the main housing structure, the nozzle member having a spray aperture and a spray nozzle button configured to dispense a marking material from a spray can through the spray aperture; an optical measuring apparatus contained within the main housing structure for real-time measuring of a distance between a point of focus and the portable marking device; a housing guard disposed over the optical measuring apparatus; a spray can bracket comprising a bracket top surface, bracket bottom surface, and a bracket side surface; and a bracket sleeve comprising a front end and a rear end wherein a portion of the rear end of the bracket sleeve is coupled to the bracket top surface and the front end of the bracket sleeve is configured to engage a portion of the main housing.

In another aspect, the portable marking device of may further include aspects wherein the spray can bracket comprises a U-shape defined by at least one set of protrusions extending from the bracket side surface of the spray can bracket, wherein protrusions extend in a curved profile to mirror the external surface area of a spray can, wherein the spray can bracket further defines a mounting channel.

In another aspect, the portable marking device of may further include aspects wherein the optical measuring apparatus further comprises a multifunction button configured to: activate the power on the optical measuring apparatus, initiate the optical measuring of a distance, and send the distance to a measurement display screen.

In another aspect, the portable marking device of may further include aspects including a mounting clip wherein a first portion of the mounting clip is configured to engage the mounting channel and a second portion of the mounting clip is configured to engage a portion defined a user with a clip assembly.

In another aspect, the present disclosure may provide for a portable marking device comprising: a housing including a main housing structure and a can cover, the main housing structure having a front open end, a rear nozzle end, a top surface, a bottom surface, and a pair of opposing side walls, wherein at least one of the side walls defines an aperture, the can cover having a rear open end, a front closed end, at least one portion of the can cover extending at the rear open end to selectively engage with the aperture defined by at least one of the side walls, wherein the can cover is configured to cover a portion of a spray can for releasably securing the spray can within the housing; a nozzle member positioned at the rear nozzle end of the of the main housing structure, the nozzle member having a spray aperture and a spray nozzle button configured to dispense a marking material from a spray can through the spray aperture; an optical measuring apparatus contained within the main housing structure for real-time measuring of a distance between a point of focus and the portable marking device; a housing guard disposed over the optical measuring apparatus; a spray can bracket comprising a bracket top surface, bracket bottom surface, and a bracket side surface; and the spray can containing the marking material therein, the spray can having an upper spray end, configured to be removably inserted through the front open end of the main housing structure until the upper spray end cooperatively engages the nozzle member.

In another aspect, the portable marking device of may further include aspects wherein the spray can bracket comprises a U-shaped defined by at least one set of protrusions extending from the bracket side surface of the spray can bracket, wherein protrusions extend in a curved profile to mirror the external surface area of the spray can.

In another aspect, the portable marking device of may further include aspects further comprising an activation button configured to: activate the power on the optical measuring apparatus, initiate the optical measuring of a distance, and send the distance to a measurement display screen.

In another aspect, the portable marking device of may further include aspects including a vibrating notification system, vibrating motor, wherein the vibrating notification system initiates the vibrating motor of in response to the optical measuring apparatus measuring a threshold distance between a point of focus and the portable marking device.

In further aspects, the present disclosure provides an optical measuring means further comprises a real-time optical measuring apparatus. In yet another aspect, the optical measuring means comprises laser range finder optics.

In various aspects, the present disclosure provides a marking component or marking apparatus wherein the marking component or marking apparatus further comprises a spray can or foam spray can may comprise at least one of: a fluorescent marking spray, a spray paint and a vanishing spray product.

In further aspects, the present disclosure provides a housing wherein the housing further comprises at least one of a range reading button, a mini USB charge port, a spray foam nozzle, squeeze points for can release, and laser range finder optics. In a further aspect, the housing can further comprise a motor. The motor can be a vibrating motor in electrical communication with at least one controller. The at least one controller can be configured to send signals to the motor causing the motor to actuate. In one aspect the motor can be a vibrating motor, wherein the controller is configured to send an actuating signal to the vibrating motor when the laser range finder calculates the appropriate distance.

In still further aspects, the disclosed real-time measurement and marking apparatus may further comprise a small lightweight canister with an attachment strap for comfortable portability around a waist. In still further aspects, the disclosed real-time measurement and marking apparatus may be configured such that the canister mold is uniquely configured in a custom bio-mechanical design such that it fits ergonomically around the hand allowing for superior grip. In still further aspects, the disclosed real-time measurement and marking apparatus may be configured such that the canister further comprises a slip free bond applicator especially in wet weather. In still further aspects, the disclosed real-time measurement and marking apparatus may be configured for a left-hand and right-hand design.

In further aspects, the disclosed real-time measurement and marking apparatus 1100 may further comprise GPS and other chip technologies are also embedded in the apparatus. In at least one aspect, the real-time measurement and marking apparatus 1100 may comprise a global positioning satellite navigation technology including real-time kinematic (RTK) technique that uses carrier-based ranging and provides ranges (and therefore positions) that are orders of magnitude more precise than those available through code-based positioning. RTK techniques may be configured upon the basic concept of reducing and removing errors common to a base station and rover pair providing higher accuracies including centimeter-level positioning, up to 1 cm+1 ppm accuracy. RTK technology may be used to enhance the distance range calculation whereby the range may be calculated by determining the number of carrier cycles between the satellite and the rover station, then multiplying this number by the carrier wavelength. In at least one embodiment, the calculated ranges may include errors from such sources as satellite clock and ephemerides, and ionospheric and tropospheric delays. RTK approaches to calculating distance may be utilized to eliminate these errors and to take advantage of the precision of carrier-based measurements. RTK performance requires measurements to be transmitted from the base station to the rover station. A process of ambiguity resolution may determine the number of whole cycles whereby high precision GNSS receivers can resolve the ambiguities almost instantaneously. Rovers may determine their position using algorithms that incorporate ambiguity resolution and differential correction. Like DGNSS, the position accuracy achievable by the rover depends on, among other things, its distance from the base station (referred to as the "baseline") and the accuracy of the differential corrections. Corrections are as accurate as the known location of the base station and the quality of the base station's satellite observations. Site selection is important for minimizing environmental effects such as interference and multipath, as is the quality of the base station and rover receivers and antennas. real-time measurement and marking apparatus 1100 may be configured to utilize RTK technology and methodology to calculate more accurate distances.

Network RTK is based on the use of several widely spaced permanent stations. Depending on the implementation, positioning data from the permanent stations is regularly communicated to a central processing station. On demand from RTK user terminals, which transmit their approximate location to the central station, the central station calculates and transmits correction information or corrected position to the RTK user terminal. The benefit of this approach is an overall reduction in the number of RTK base stations required. Depending on the implementation, data may be transmitted over cellular radio links or other wireless medium. In another aspect, the real-time measurement and marking apparatus 1100 may be configured to provide location tracking and motion tracking utilizing technologies including but not limited to: inertial motion units (IMU), multi-axis accelerometers, multi-axis gyroscopes, multi-axis magnetometers, and location and motion tracking hardware and software.

In still further aspects, the disclosed real-time measurement and marking apparatus 1100 may be configured to record product usage and other metrics is available via USB to an IBLC™ software platform. The software platform may be configured such that referees will be able to upload analytical data recorded during a game to IBLC software and various third-party organizations and referee associations. The information gathered on every usage will be used in a long-term study. Data may be uploaded using BLUETOOTH® and BLUETOOTH® LOW ENGERY (LE) technology. BLUETOOTH® Basic Rate/Enhanced Data Rate (BR/EDR) may be designed for low power operation and also leverages a robust Adaptive Frequency Hopping approach, transmitting data over 79 channels. The BLUETOOTH® BR/EDR radio includes multiple PHY options that support data rates from 1 Mb/s to 3 Mb/s, and supports multiple power levels, from 1 mW to 100 mW, multiple security options, and a point-to-point network topology. The BLUETOOTH® Low Energy (LE) radio may be designed for very low power operation. The BLUETOOTH® Low Energy aspect of the real-time measurement and marking apparatus 1100 may be configured with BLUETOOTH® transmitters and receivers that enable reliable operation in the 2.4 GHz frequency band, providing a robust frequency-hopping spread spectrum approach that transmits data over 40 channels. The BLUETOOTH® LE radio may be configured to provide signal and data transmission including multiple PHY options that support data rates from 125 Kb/s to 2 Mb/s, multiple power levels, from 1 mW to 100 mW, as well as multiple security options up to government grade. BLUETOOTH® LE also supports multiple network topologies, including point-to-point, broadcast and mesh networking. The real-time measurement and marking apparatus 1100 may also utilize other communication media including but not limited to Wi-Fi, radio, and other wireless communication media. The real-time measurement and marking apparatus 1100 may comprise receivers, transmitters, antennas, and communication and transmission means.

In further aspects, the communication mediums of the real-time measurement and marking apparatus 1100 may be configured to send and receive data and information to other devices including but not limited to: wearables, wearable devices, smart watches, smart phones, Internet-of-Things connected devices (IoT), Socket-on-Chip (SoC) devices, electronic devices, other real-time measurement and marking apparatuses 1100 and the like. In one or more aspects, the real-time measurement and marking apparatus 1100 may be configured to connect with the other devices via various communication mediums. The real-time measurement and marking apparatus 1100 may be connected to one or more of the other devices in a manner that utilizes the communication mediums and technology (including specifications such as: BLUETOOTH®, GPS, RTK, and other communication media standards) whereby the connection allows for tracking of location, distance, proximity, threshold distance, distance measurement, and other associated functions.

In one or more aspects, the real-time measurement and marking apparatus 1100 may be configured to connect with one or more sensors via various communication mediums including GNSS position sensors, inertial motion unit (IMU), BLE, ANT, and other technological standards and protocols. The one or more sensors including but not limited to biometric sensors configured to provide biometric data such as heart-rate, oxygen, caloric exertion, performance metrics, health metrics, intensity of movement and activity, electrocardiogram (ECG) and health data and information. In at least one aspect, the real-time measurement and marking apparatus 1100 may further comprise the one or more sensors. In yet another aspect, the real-time measurement and marking apparatus 1100 may be configured to connect, pair, or communicate for data transmission with the one or more sensors. The one or more sensors may be worn by other users, referees, officials, and others. In at least one aspect, data may be transmitted, received, and analyzed in real-time providing real-time data analytics to the one or more sensors as well as the one or more real-time measurement and marking apparatus 1100. In further aspects, real-time measurement and marking apparatus 1100 may include internal and external memory for live, real-time data storage, a rechargeable and/or renewable power supply including rechargeable batteries, kinetic energy renewable power supply, solar energy power supply, and other renewable power supply. In yet another aspect, real-time measurement and marking apparatus 1100 may include water-resistant, waterproof, splash-proof, sweat-resistant coatings or materials to the outer surfaces.

In further aspects, the real-time measurement and marking apparatus 1100 may be configured to have one or more buttons and a display. The buttons may be multifunctional such that they may be configured to be programmed to initiate the measuring function of the real-time measurement and marking apparatus 1100, toggle the real-time measurement and marking apparatus 1100 power on and off. The real-time measurement and marking apparatus 1100 may provide a display 110 for showing the measured distance and any other information including but not limited to battery life, power level, BLUETOOTH® status, and other information. In at least one aspect, real-time measurement and marking apparatus 1100 may provide a USB port for power charging and manual docking, data transmission, and synching with a database, server, system, and computer. In yet another aspect, the real-time measurement and marking apparatus 1100 may be configured to wirelessly charge or charge via contact with a surface, wherein the surface may be a power charging surface. In yet another aspect, real-time measurement and marking apparatus 1100 may comprise a vibration motor with a rechargeable battery. The vibration motor can be used for haptic feedback including a vibration notification when one or more events occur, e.g. 10 yards threshold from a ball target is reached, BLUETOOTH® pairing, low power, error in data transmission, and other predetermined, selected, determined, or other events and occurrences.

In further aspects, the real-time measurement and marking apparatus 1100 devices and systems can be used for a variety of purposes. For example, the real-time measurement and marking apparatus 1100 may be useful for in a variety of industries including but not limited to sporting events, sports contests, construction, scientific research, transportation, utility services, and the like.

According to various further aspects of the disclosure, the real-time measurement and marking apparatus 1100 devices and systems can comprise multiple configurations. In aspects, FIGS. 1-16 show various views and features of a device for both measuring and marking distances. For example, the real-time measurement and marking apparatus 1100 may be configured for both measuring and marking distances between a soccer game ball and defensive line during a free kick placement by an official in accordance with the present disclosure.

Figure 11:
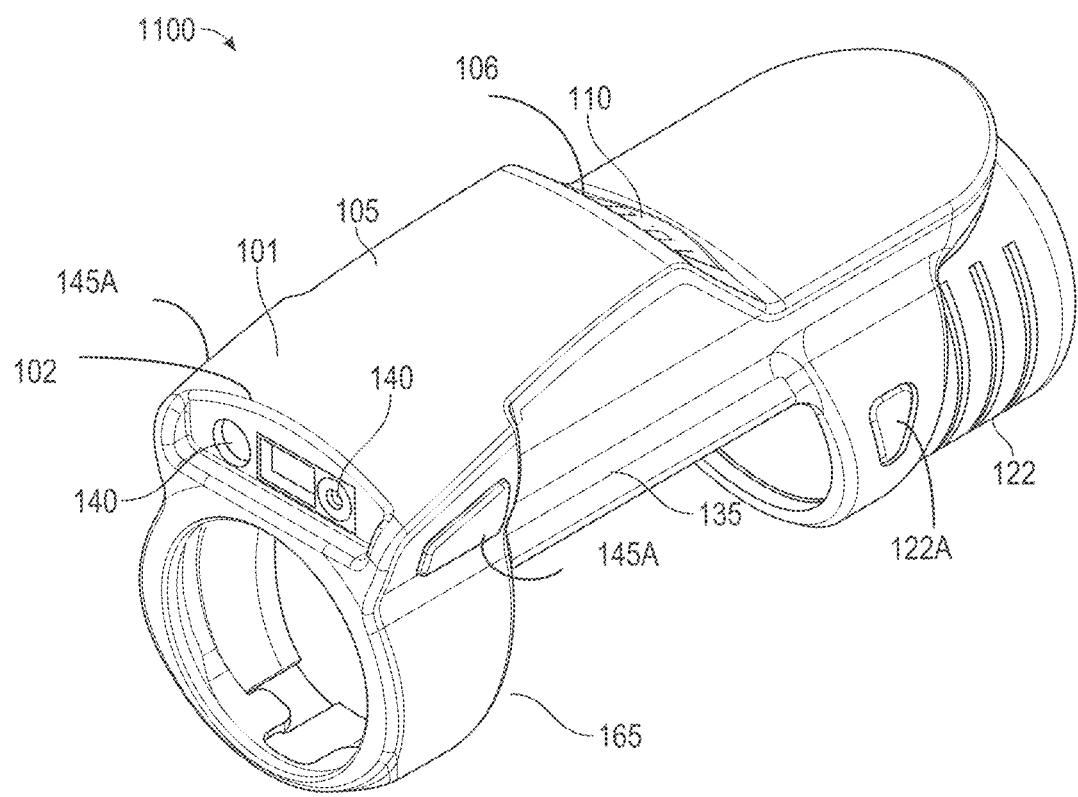
FIG. 11 shows an isometric view of the real-time measurement and marking apparatus in accordance with an embodiment of the present disclosure.

FIG. 11 shows an isometric view of the real-time measurement and marking apparatus 1100 in accordance with an embodiment of the present disclosure. More specifically, FIG. 11, 1100 shows a front isometric view of the real-time measurement and marking apparatus 1100. FIG. 11, 1100 shows some of the multiple components of the partial assembly real-time measurement and marking apparatus 1100 as follows: a main housing 105, range reading button 115, a cover 122, a laser range finder 140, a display 110, cover release button 122A, and housing squeeze points 135.

In yet another aspect, the real-time measurement and marking apparatus 1100 of may further include aspects wherein the optical measuring apparatus is configured to transmit a second laser on the point of focus, wherein the optical measuring apparatus is further configured to determine the real-time measurement based a first measurement of the first laser and a second measurement of the second laser. In yet another aspect, the real-time measurement and marking apparatus 1100

In these embodiments, the real-time measurement and marking apparatus device comprises components of the real-time measurement and marking apparatus 1100 including but not limited to: a precision real-time laser measuring component, a main housing; a foam spray can; bracket; and a universal clip. While FIG. 11 shows the real-time measurement and marking apparatus 1100 in an independent embodiment, other figures show the real-time measurement and marking apparatus 1100 with a spray can 120 engaged. In other embodiments, the additional figures show the real-time measurement and marking apparatus 1100 having additional attachments including one or more can holsters, spray can brackets, and spray can holders which may allow the real-time measurement and marking apparatus 1100 to be functionally integrated with auxiliary components which attach to the spray can including a clip assembly, belt clip, and other auxiliary holders and spray can attachments. FIGS. 1A, 1B, 2, 3, 4, 5, 6, 7, 8, 9, 10, 12, and 16 all show various embodiments and implementations wherein the real-time measurement and marking apparatus 1100 may be integrated with one or more of these auxiliary components.

In at least one embodiment, real-time measurement and marking apparatus 1100 may further comprise one or more of these auxiliary components.

FIG. 11 shows the real-time measurement and marking apparatus 1100 having an activation button 145A. Real-time measurement and marking apparatus 1100 may further comprise a USB port 145B (not visible from this drawing angle) wherein the USB port 145B may be configured as a mini USB, micro USB, nano USB or standard USB female port. The USB port 145B may provide for charging power for the real-time measurement and marking apparatus 1100. The USB port 145B may provide for connectivity to a computing device for transferring data from the real-time measurement and marking apparatus 1100 to a computing device. In at least one embodiment, the activation button 145A may be a multifunction button whereby toggling the button, depressing the button once, depressing the button two or more times in succession, and holding the button down for one or mom periods of time may reside in one or mom various functions of the real-time measurement and marking apparatus 1100. The one or more various functions may include but are not limited to: toggling power on and off, triggering and/or initiating laser measurement of the distance, can cover release, display of a digital numeric readout, activating a backlight on the display, activating a BLUETOOTH® connection to one or more devices, displaying remaining battery life, activation of a vibrating motor, toggling vibrating motor accurate distance notification on and off, activation of a vibrating motor notification for laser acquisition of proper alignment with target for proper distance measurement, activation of alert notification system for proper alignment with ball target or when appropriate target distance from initial ball target is reached, and other useful functions. The activation button 145A and USB port 145B may be positioned at other placements on the main housing 105, front housing guard 102, bottom surface 165 of mam housing, or other placements of the real-time measurement and marking apparatus 1100. In one aspect, placement of the activation button 145A in this position enables the operation of the real-time measurement and marking apparatus 1100 using thumb middle and forefinger.

Figure 1B:
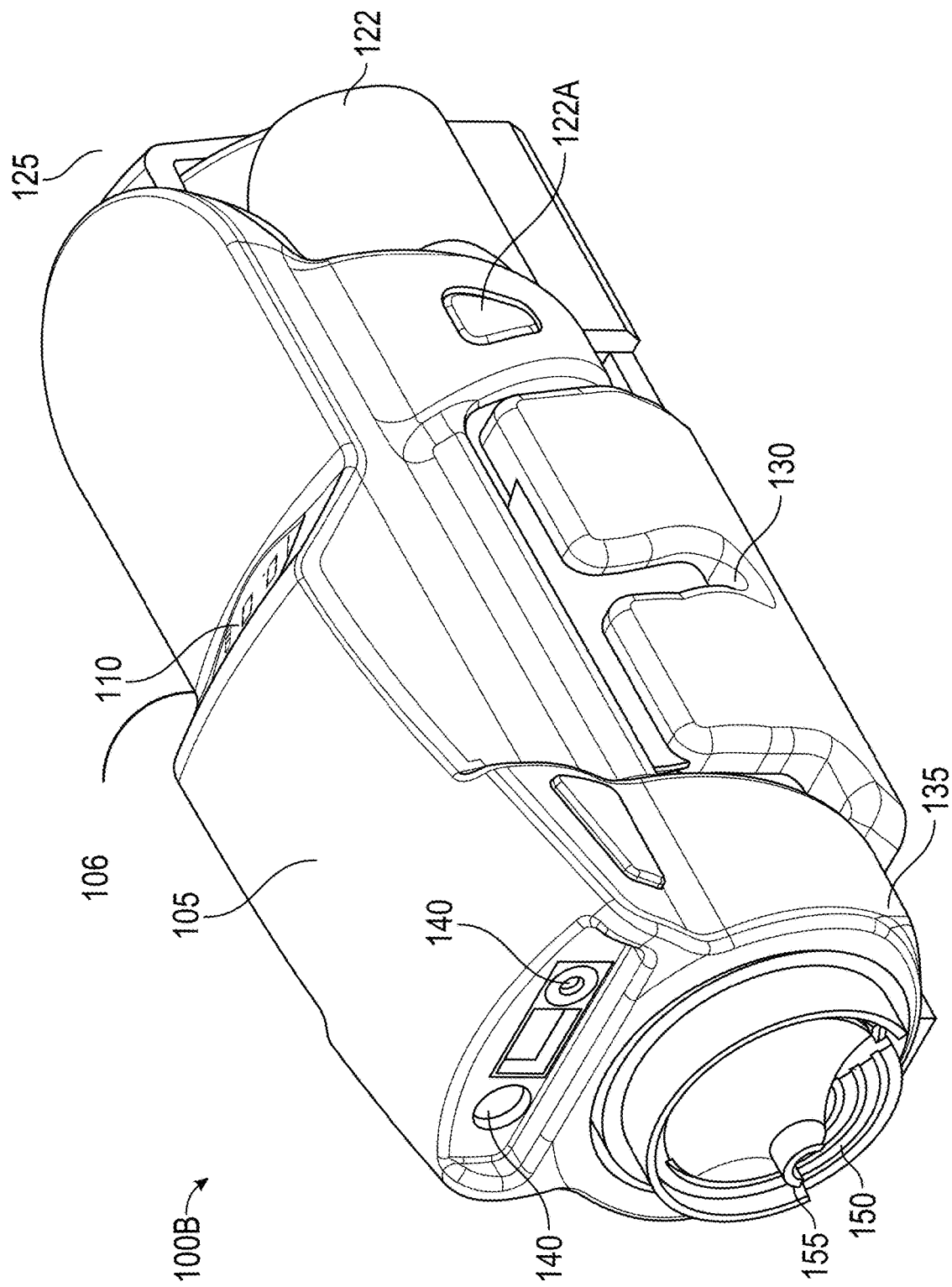

FIGS. 1A and 1B show perspective and isometric views of the real-time measurement and marking apparatus 1100 in accordance with an embodiment of the present disclosure. More specifically, FIG. 1A, 100A shows a rear left perspective view of the real-time measurement and marking apparatus 1100 fully integrated with auxiliary components, FIG. 1B, 100B shows a top right perspective view of the real-time measurement and marking apparatus 1100 fully integrated with auxiliary components. FIG. 1A, 100A and FIG. 1B, 100B show some of the multiple components of the full assembly real-time measurement and marking apparatus as follows: a main housing 105, a front housing guard 102, a foam spray can 120, a spray nozzle button 150, a spray nozzle aperture 155, clip mounting channel 170, a laser range finder 140, a display 110, a spray can bracket 125, a display 110, a bracket side grip 130, housing squeeze points 135, a mini USB port 145B, an activation button 145A, and a bottom surface 165 of the male housing. Front housing guard 102 may be configured as an elevated member affixed to the main housing 105. In one or more embodiments, the front housing guard 102 may be used as a handle for the real-time measurement and marking apparatus 1100.

FIGS. 1A and 1B shows the real-time measurement and marking apparatus having an activation button 145A and a USB port 145B wherein the USB port 145B may be configured as a mini USB, micro USB, nano USB or standard USB female port. The USB port 145B may provide for charging power for foe real-time measurement and marking apparatus 1100. The USB port 145B may provide for connectivity to a computing device for transferring data from the real-time measurement and marking apparatus 1100 to a computing device, in at least one embodiment, the activation button 145A may be a multifunction button whereby toggling the button, depressing the button once, depressing the button two or more times in succession, and holding tire button down for one or more periods of time may result in one or more various functions of the real-time measurement and marking apparatus 1100. The one or more various functions may include but am not limited to: toggling power on and off, triggering and/or initiating laser measurement of the distance, can cover release, display of a digital numeric readout, activating a backlight on the display, activating a BLUETOOTH® connection to one or more devices, displaying remaining battery life, activation of a vibrating motor, toggling vibrating motor accurate distance notification on and off, activation of a vibrating motor notification for laser acquisition of proper alignment with target for proper distance measurement, activation of alert notification system for proper alignment with target or when appropriate threshold distance from initial target is reached, and other useful functions. The activation button 145A and USB port 145B may be positioned at other placements on the main housing 105, front housing guard 102, bottom surface 165 of main housing, or other placements of the real-time measurement and marking apparatus. In one aspect, placement of the activation button 145A in this position enables the operation of the real-time measurement and marking apparatus 1100 using thumb middle and forefinger.

Figure 2:
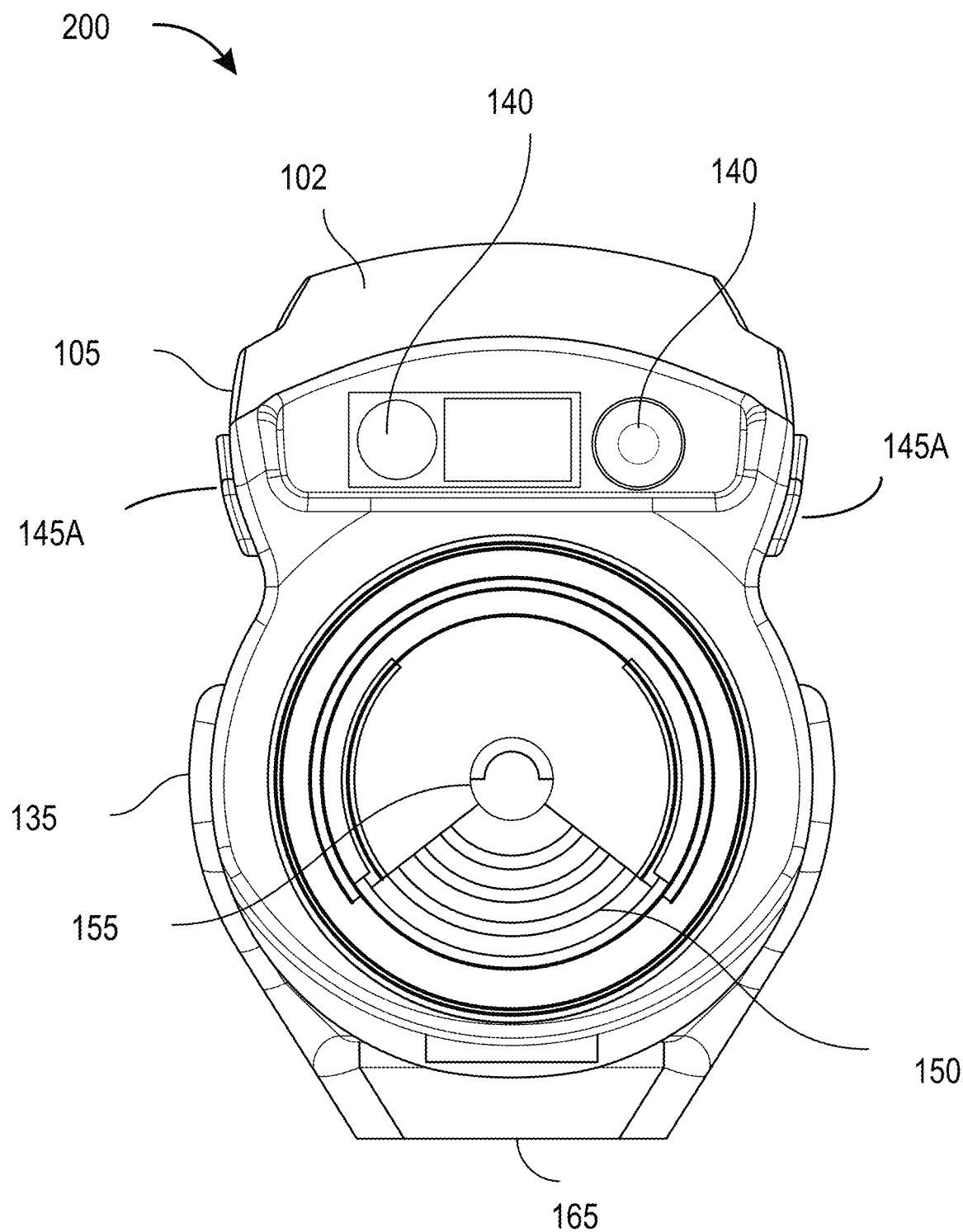
FIG. 2 shows a front view of the real-time measurement and marking apparatus in accordance with an embodiment of the present disclosure.

FIG. 2 shows a front view of the real-time measurement and marking apparatus HOC) fully integrated with auxiliary components in accordance with an embodiment of tire present disclosure. More specifically, FIG. 2, 200 shows the front view of the real-time measurement and marking apparatus, FIG. 2, 200 shows some of the multiple components of the foil assembly real-time measurement and marking apparatus as follows: a main housing 105, a spray nozzle button 150, a spray nozzle aperture 155, a laser range finder 140 comprising the laser emitter and reflection receiver, housing squeeze points 135, an activation button 145A, and a bottom surface 165 of the mam housing. The housing squeeze points 135 may be configured to provide comfortable, aesthetic, and ergonomic gripping posture at the ideal position for handheld use of the real-time measurement and marking apparatus. Housing squeeze points 135 may be configured to allow for ease of removal of the foam spray can 120. Housing squeeze points 135 may also be configured to allow for convenient replacement of the foam spray can 120 once the marking spray is completely used. The housing squeeze points 135 configured to allow the real-time measurement and marking apparatus 1100 to be held in one hand of a user while the foam spray can 120 is removed and replaced with the opposite hand of a user. In one or more instances, one or more users may be involved in the replacement and or removal of various components of the real-time measurement and marking apparatus.

Figure 3:
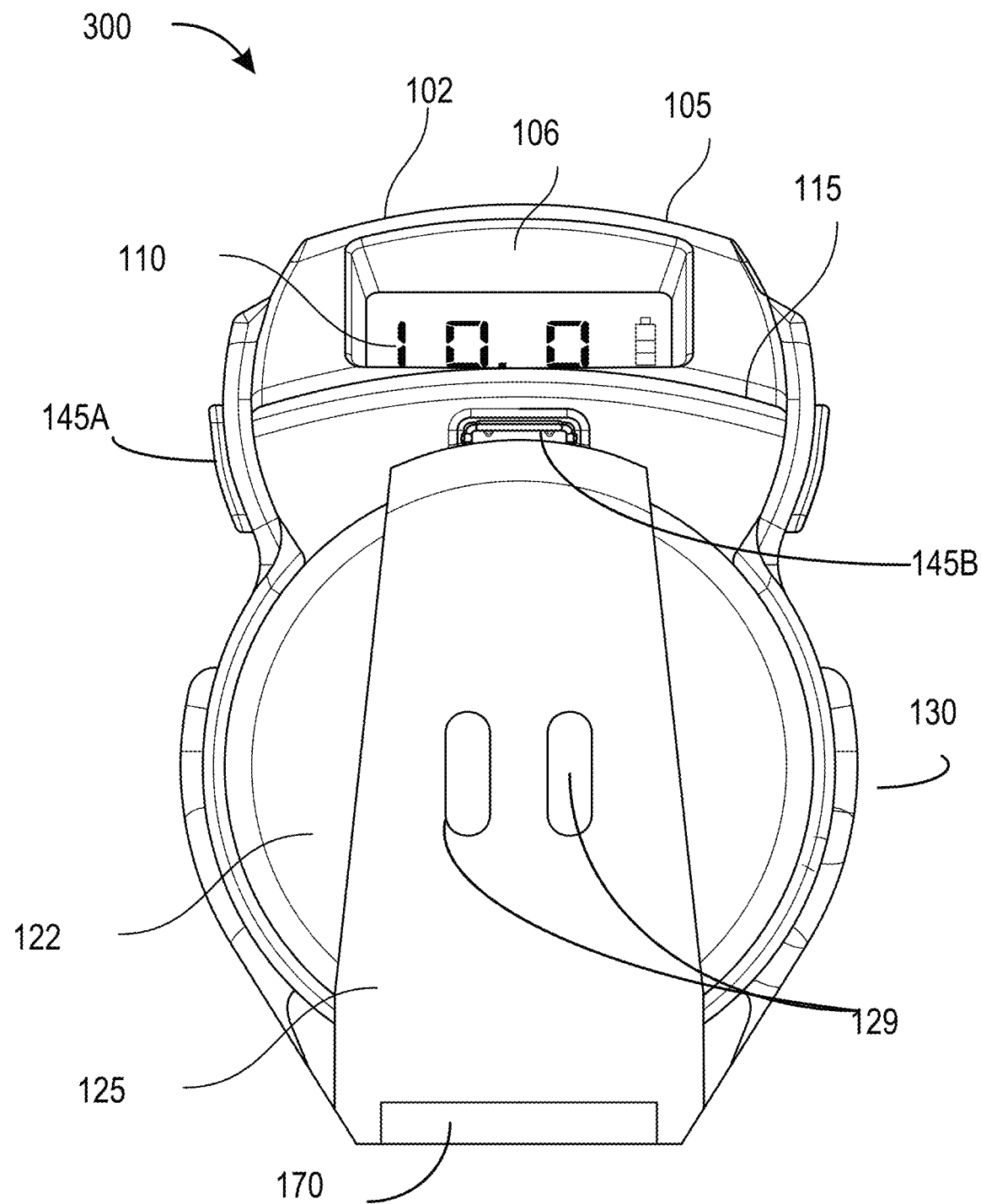
FIG. 3 shows a rear view of the real-time measurement and marking apparatus in accordance with an embodiment of the present disclosure.

FIG. 3 shows a rear view of the real-time measurement and marking apparatus 1100 fully integrated with auxiliary components in accordance with an embodiment of the present disclosure. More specifically, FIG. 3, 300 shows the back view of the real-time measurement and marking apparatus. FIG. 3, 300 shows some of the multiple components of the full assembly real-time measurement and marking apparatus as follows: a main housing 105, clip mounting channel 170, clip assembly, range reading button 115, a display 110, a spray can bracket 125, a bracket side grip 130, a mini USB port 145B, a activation button 145A, and spray can bracket 125 may be define as a fastening aperture 129 configured to allow for attachment of a string, a key chain, a necklace, cord, or corded member. This spray can bracket 125 may be adapted to allow for convenient carrying of the real-time measurement and marking apparatus or the foam spray can 120. FIG. 3, 300 also shows the display 110 which may include but not be limited to a LED segmented display configured to display the laser measured distance between the point of focus on the playing field (i.e., player, game ball, marker, or other object) and the real-time measurement and marking apparatus 1100. The display 110 may be configured to one or more sizes that fit the main housing 105 of the real-time measurement and marking apparatus 1100. The main housing 105 can also include a brow visor 106. The brow visor 106 can extend from the housing 105 to reduce glare and aid in visibility of the display 110. In one aspect, in operational use, placement of the brow visor 106 in this position allows for natural shading from a user's arm in bright conditions to improve visibility of the display. Display sizes may include but are not limited to a 5×7 LED segmented display or a larger or smaller display adapted to fit the main housing 105. In one or more aspects, the display may be an organic light emitting diode (OLED) display. Display In a further aspect, the display can also provide a power level indicator 111. The power level indicator can provide to the user the amount of electrical power held in reserve, which would allow the electrical components of the apparatus to continue to be used.

Figure 4:
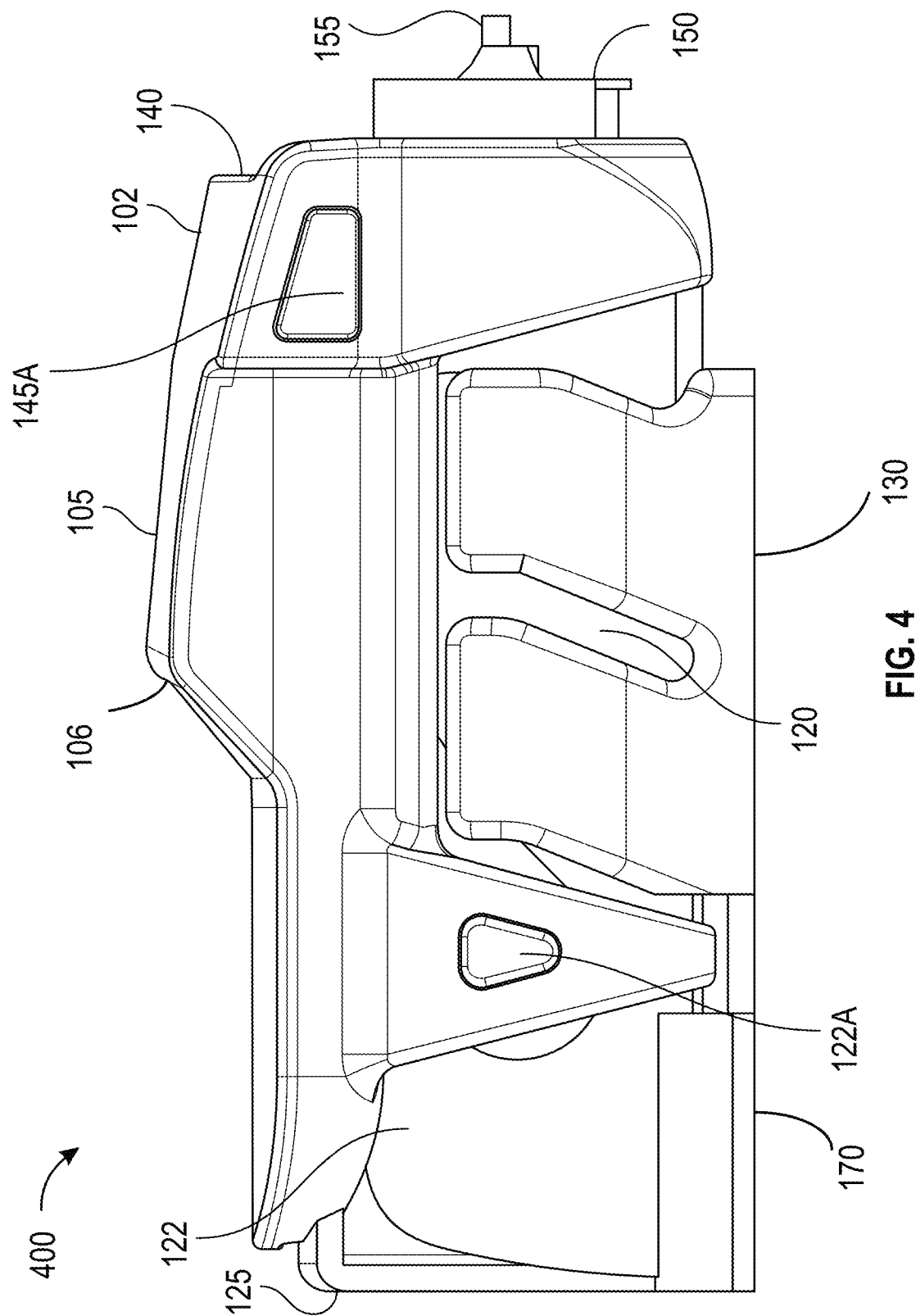
FIG. 4 shows a side view of the real-time measurement and marking apparatus in accordance with an embodiment of the present disclosure.
Figure 5:
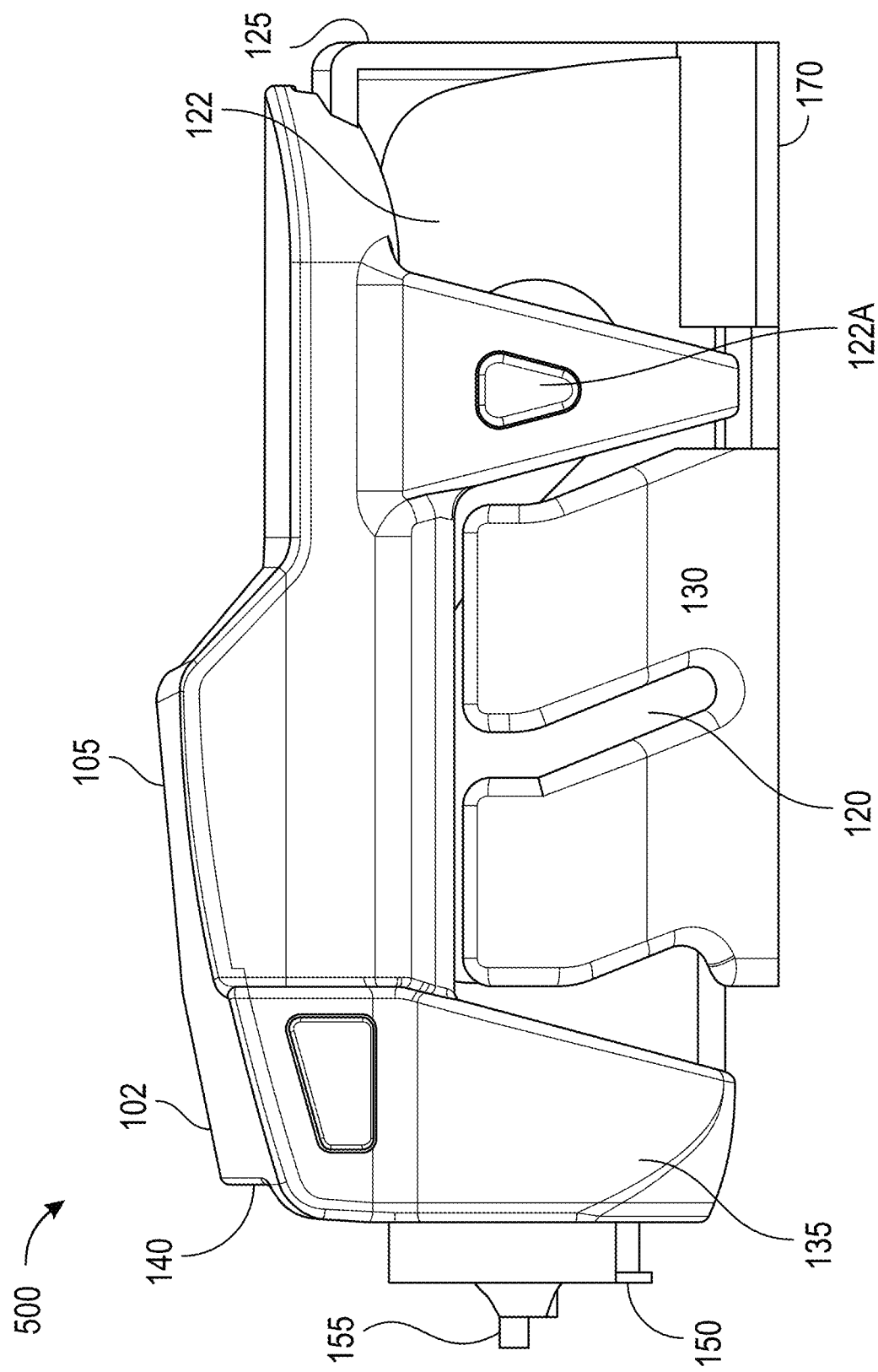
FIG. 5 shows another side view of the real-time measurement and marking apparatus in accordance with an embodiment of the present disclosure.

FIGS. 4 and 5 show a side view of the real-time measurement and marking apparatus 1100 fully integrated with auxiliary components in accordance with an embodiment of the present disclosure. More specifically, FIGS. 4, 400 shows a right-side view of the real-time measurement and marking apparatus in accordance with an embodiment of the present disclosure. FIG. 5, 500 shows the left side view of the real-time measurement and marking apparatus. In FIGS. 4 and 5, 400 and 500 show some of the multiple components of the full assembly real-time measurement and marking apparatus as follows: a cover 122, a main housing 105, a foam spray can 120, a spray nozzle button 150, a spray nozzle aperture 155, clip mounting channel 170, range reading button 115, a laser range finder 140, a display 110, a spray can bracket 125, a bracket side grip 130, housing squeeze points 135, a activation button 145A, and a bottom surface 165 of the main housing. The main housing 105 cast also comprise a cover release button 122A. The cover release button 122A can be pressed to disengage the housing 101 from the spray can 120.

Figure 6:
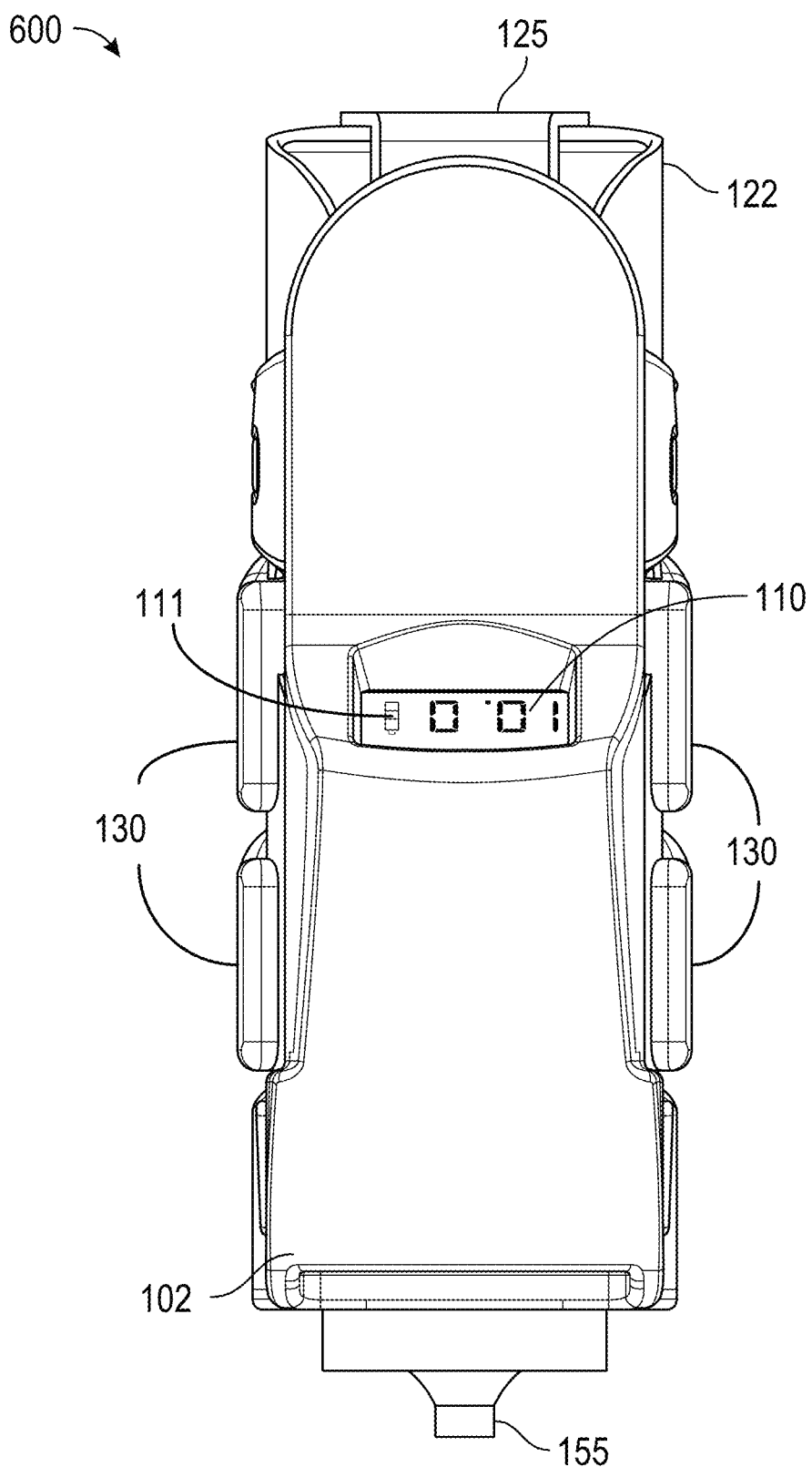
FIG. 6 shows a top view of the real-time measurement and marking apparatus in accordance with an embodiment of the present disclosure.

FIG. 6 shows a top view of the real-time measurement and marking apparatus 1100 fully integrated with auxiliary components in accordance with an embodiment of the present disclosure. More specifically, FIG. 6, 600 shows the reversed top view of the real-time measurement and marking apparatus. FIG. 6, 600 shows some of the multiple components of the full assembly real-time measurement and marking apparatus as follows: a main housing 105, a spray nozzle button 150, a spray nozzle aperture 155, clip assembly, range reading button 115, a laser range finder 140, a display 110, a spray can bracket 125, and a bracket side grip 130.

Figure 7:
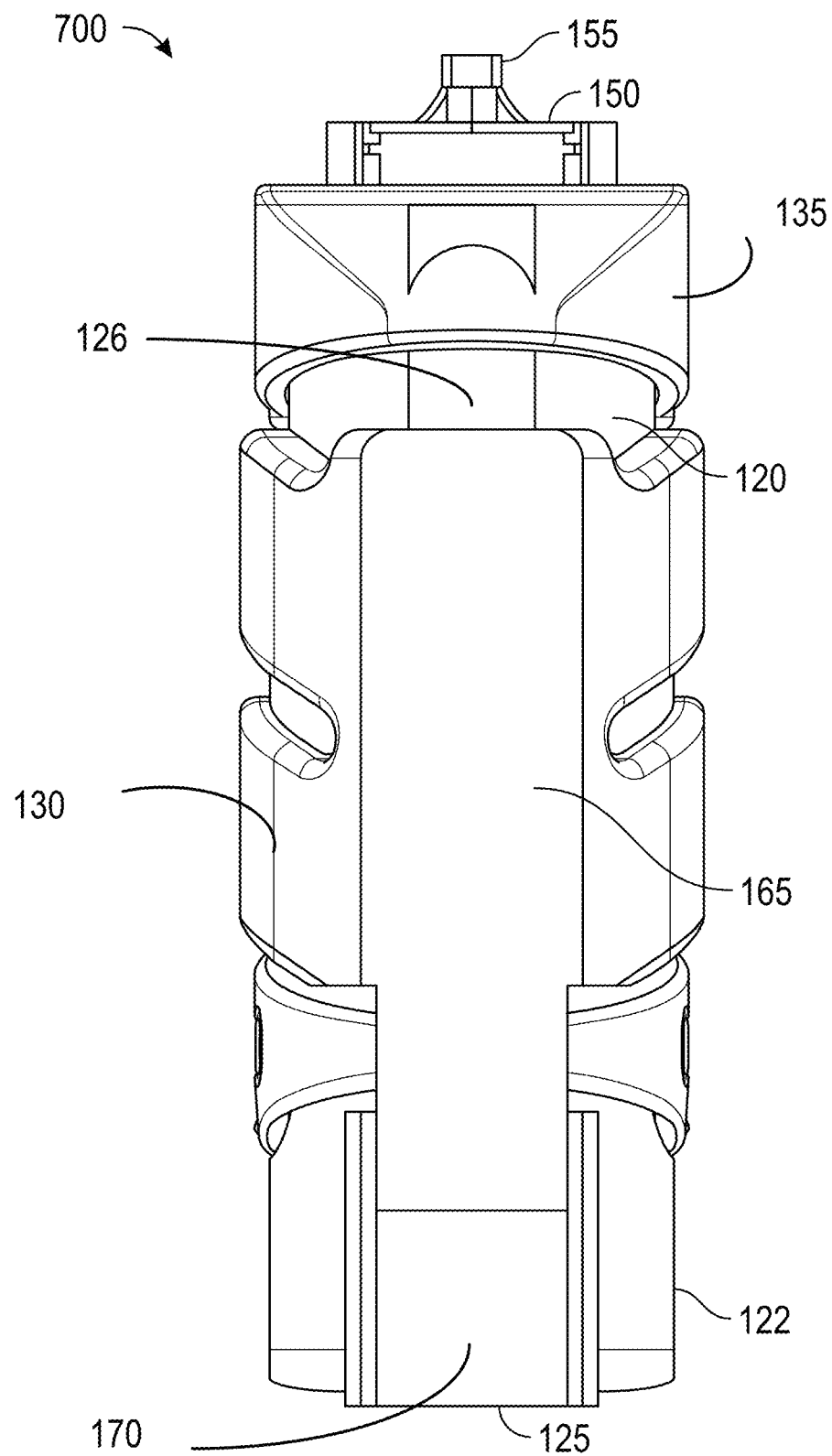
FIG. 7 shows a bottom view of the real-time measurement and marking apparatus in accordance with an embodiment of the present disclosure.

FIG. 7, 700 shows a bottom view of the real-time measurement and marking apparatus 1100 fully integrated with auxiliary components in accordance with an embodiment of the present disclosure, FIG. 7, 700 shows some of the multiple components of the full assembly real-time measurement and marking apparatus as follows: a main housing 105, a foam spray can 120, a spray nozzle button 150, a spray nozzle aperture 155, clip mounting channel 170, a bracket side grip 130, housing squeeze points 135, and a bottom surface 165 of the main housing.

Figure 8:
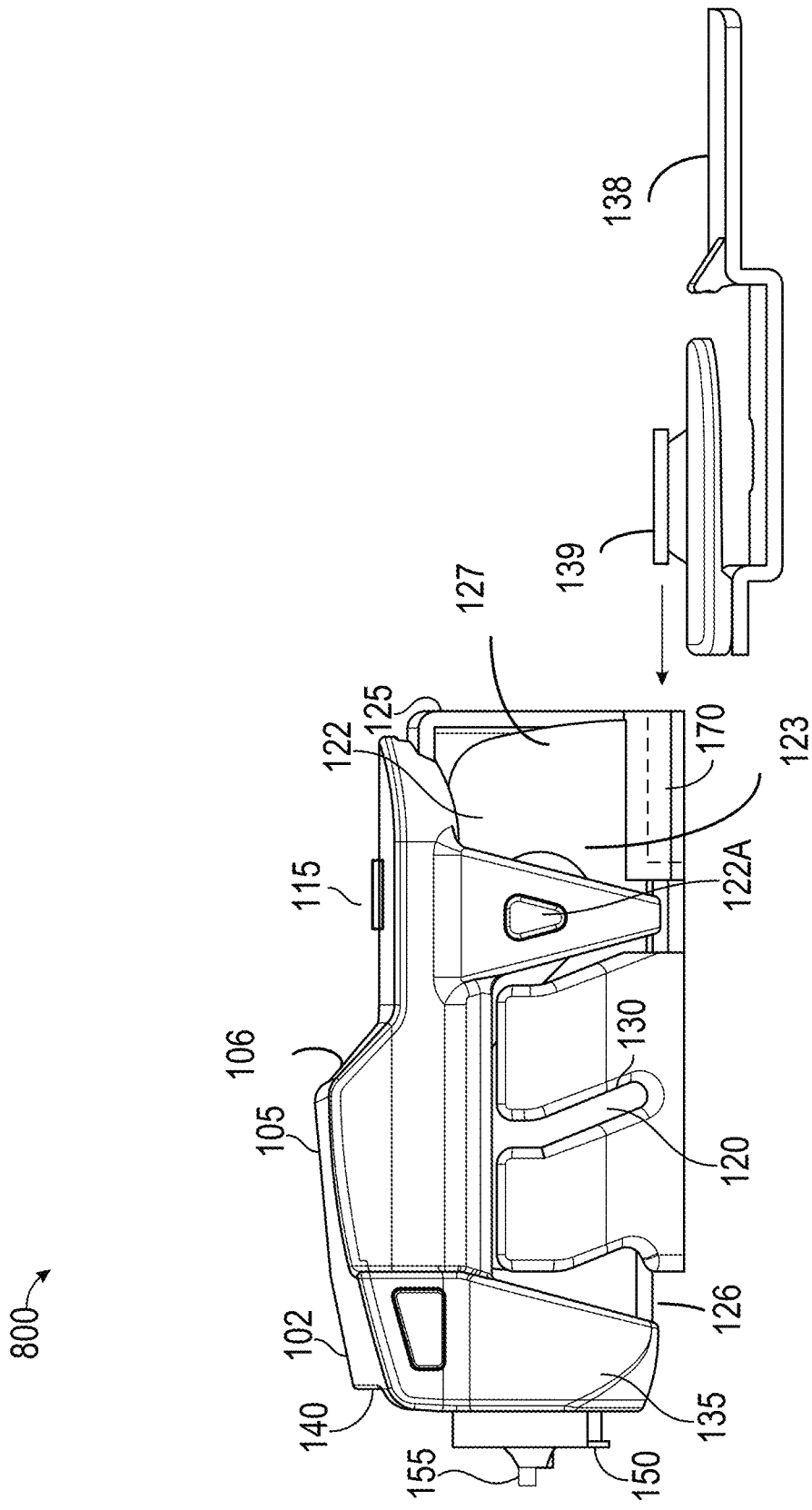
FIG. 8 shows a side view of the real-time measurement and marking apparatus in accordance with an embodiment of the present disclosure.

FIG. 8 shows a partially exploded view of the full assembly of the real-time measurement and marking apparatus 1100 fully integrated with auxiliary components in accordance with an embodiment of the present disclosure. More specifically. FIG. 8, 800 shows a side partially exploded view of the real-time measurement and marking apparatus 1100 which shows the side of the real-time measurement and marking apparatus 1100. FIG. 8, 800 shows a can cover 122 configured to cover a base of the foam spray can 120. FIG. 8, 800 shows some of the multiple components of the full assembly real-time measurement and marking apparatus as follows: a cover 122, a main housing 105, a foam spray can 120, a spray nozzle button 150, a spray nozzle aperture 155, clip mounting channel 170, range reading button 115, a laser range finder 140, a display 110, a spray can bracket 125, a bracket side grip 130, housing squeeze points 135, an activation button 145A, and a bottom surface 165 of the main housing 465. The main housing 105 can also comprise a cover release button 122A.

The range reading button 115 shown in FIG. 8 is an alternative implementation configured such that depressing the range reading button results in laser measurement of the distance. In another embodiment, the range reading button 115 may perform one or more of the functions of activation button 115A. The cover release button 122A can be pressed to disengage the housing 101 from the spray can 120. A clip assembly 138 may slide into the clip mounting channel 170 and be attached to the real-time measurement and marking apparatus for attachment to garments, pockets, belt loops, bags, belt straps, and other clothing. In one or more embodiments, clip mounting channel 170 may attach to a clip assembly 138. The clip assembly 138 of real-time measurement and marking apparatus may comprise a connector 139 of the clip assembly having a curved top portion and a curved bottom portion with a length wherein the curved portions am semicircular curves having a lesser radius than the length. A forward-facing portion of the clip assembly may comprise a rectangular top portion with rounded edged and a curved bottom portion with a semicircular curve having a similar radius.

In at least one embodiment, the range reading button 115 may be a multifunction button whereby toggling the button, depressing the button once, depressing the button two or more times in succession, and holding the button down for one or more periods of time may result in one or more various functions of the real-time measurement and marking apparatus 1100. The one or more various functions may include but are not limited to: toggling power on and off, triggering and/or initiating laser measurement of the distance, can cover release, display of a digital numeric readout, activating a backlight on the display, activating a BLUETOOTH® connection to one or more devices, displaying remaining battery life, activation of a vibrating motor, toggling vibrating motor accurate distance notification on and off, activation of a vibrating motor notification for laser acquisition of proper alignment with target for proper distance measurement, activation of alert notification system for proper alignment with ball target or when appropriate target distance from initial ball target is reached, and other useful functions.

Figure 9:
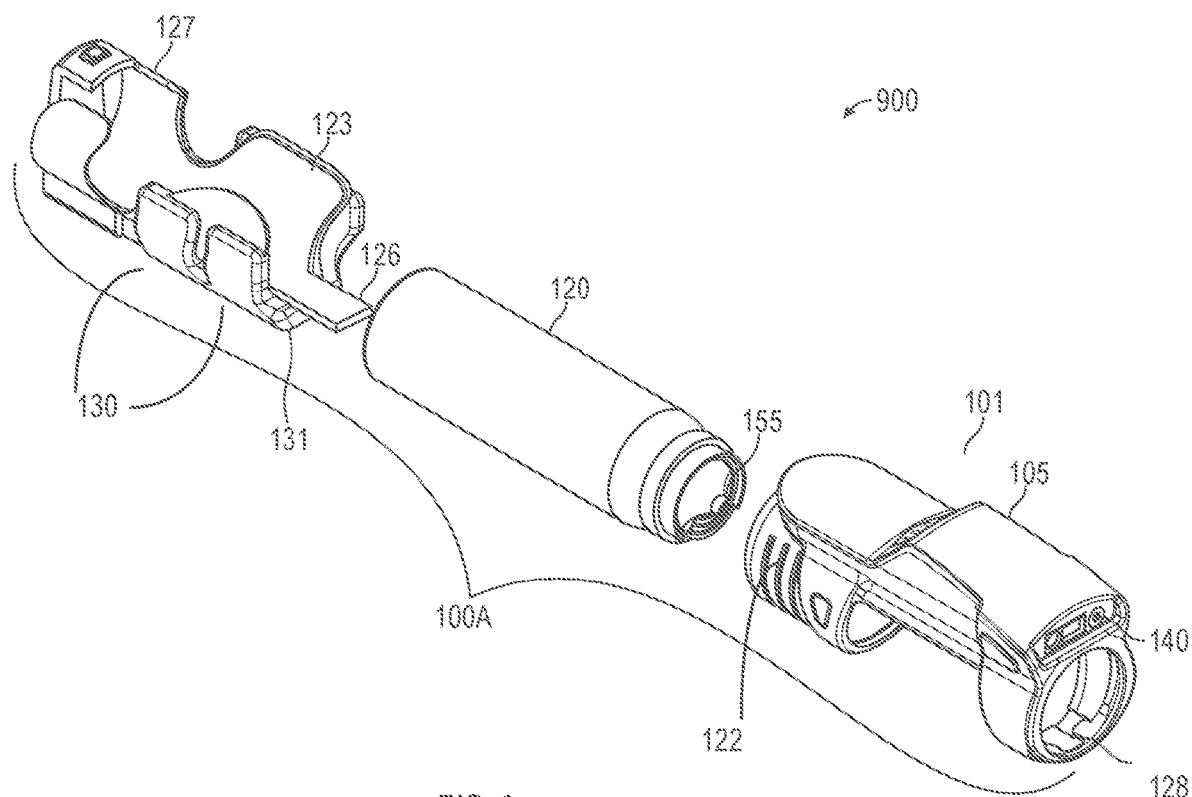
FIG. 9 shows an exploded view of the full assembly of the real-time measurement and marking apparatus in accordance with an embodiment of the present disclosure.

In FIG. 9, 900 shows a fully exploded view of the real time assembly FIG. 9 shows a fully exploded view of the full assembly of the real-time measurement and marking apparatus 1100 fully integrated with auxiliary components in accordance with an alternative embodiment of the present disclosure. More specifically, FIG. 9, 900 shows an isometric exploded view of the real-time measurement and marking apparatus 1100 which shows the side of the real-time measurement and marking apparatus 1100. The housing 105 can engage the spray can 120 by engaging the cover 122. The mounting bracket 131 can be coupled to a bracket sleeve 123. A rear portion 127 of the bracket sleeve 123 can be coupled to the mounting bracket 125. A front portion of the bracket sleeve 123 can comprise sleeve coupling member 126. The overall assembly can be further secured when the sleeve couple member is engaged the housing groove 128 located at a bottom inner surface of the housing 105. In addition, the side grips 130 can extend from the side of the mounting bracket 125 to further support the cylindrical curvature of the spray can 120.

Figure 10:
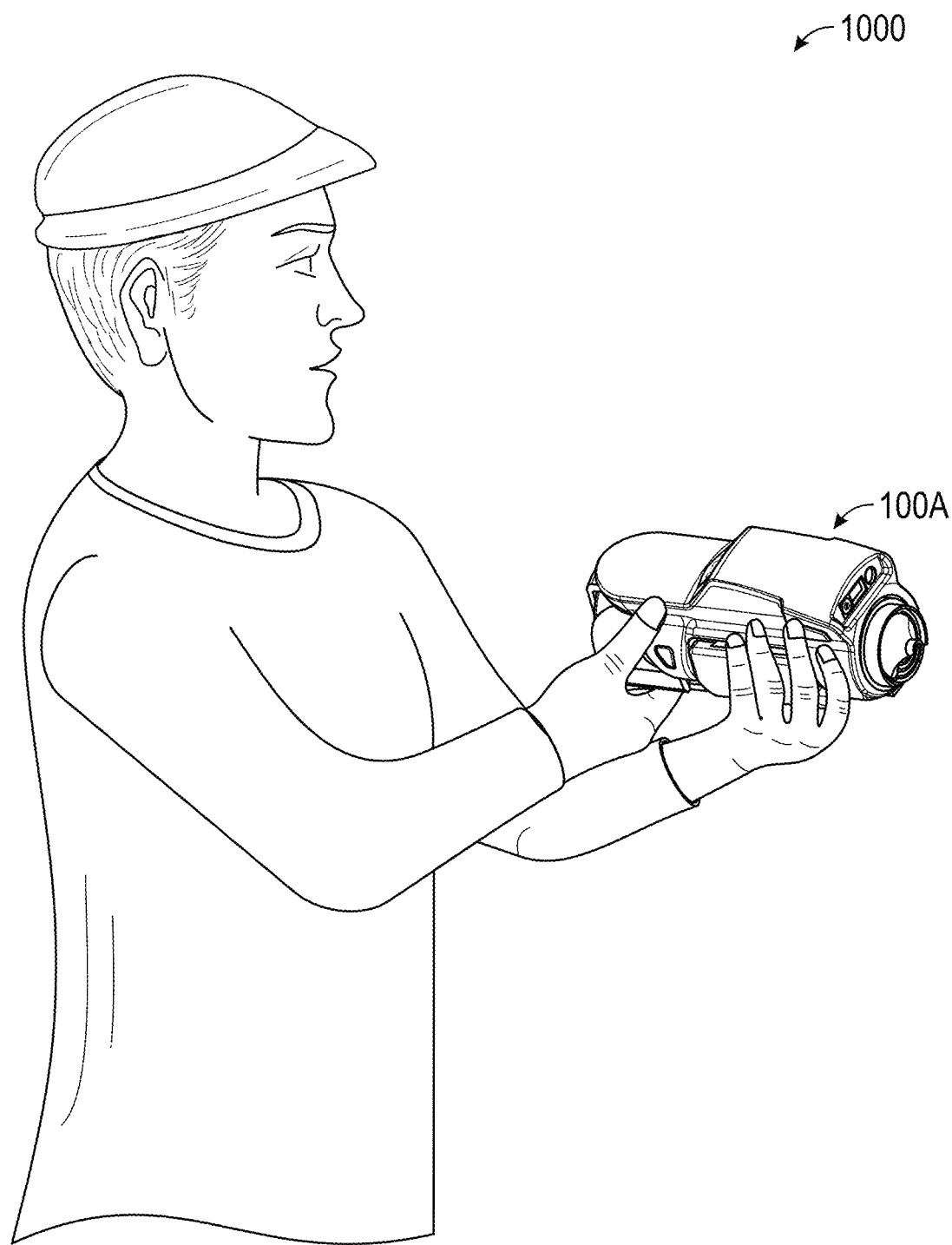
FIG. 10 shows a view of the precision real-time laser measurement and marking apparatus in an operating environment in accordance with an embodiment of the present disclosure.

In FIG. 10, 1000 shows a user, possibly a gaming official pressing an activation button 145A while aiming the real-time measurement and marking apparatus 1100 fully integrated with auxiliary components in the direction of a spot on a playing field. The real-time measurement and marking apparatus 1100 and the components may be manufactured using injection molded plastics included but not limited to Acrylonitrile Butadiene Styrene (ABS), polycarbonate alloy (PC), or PC in combination with ABS to provide additional robustness. Colors may vary according to preference however the real-time measurement and marking apparatus 1100 may be customized to match tournament colors, team colors, officials' uniforms, and the like.

FIG. 10 shows a partial assembly of the real-time measurement and marking apparatus in accordance with an embodiment of the present disclosure. More specifically, FIG. 10, 1000 shows a top front exploded view of the real-time measurement and marking apparatus 1100 which shows the top side of the real-time measurement and marking apparatus 1100. FIG. 10, 1000 shows a can cover 122 configured to cover a base of the foam spray can 120. FIG. 10, 1000 shows some of the multiple components of the full assembly real-time measurement and marking apparatus as follows: a main housing 105, range reading button 115, a cover 122, a laser range finder 140, a display 110, and housing squeeze points 135.

Figure 12:
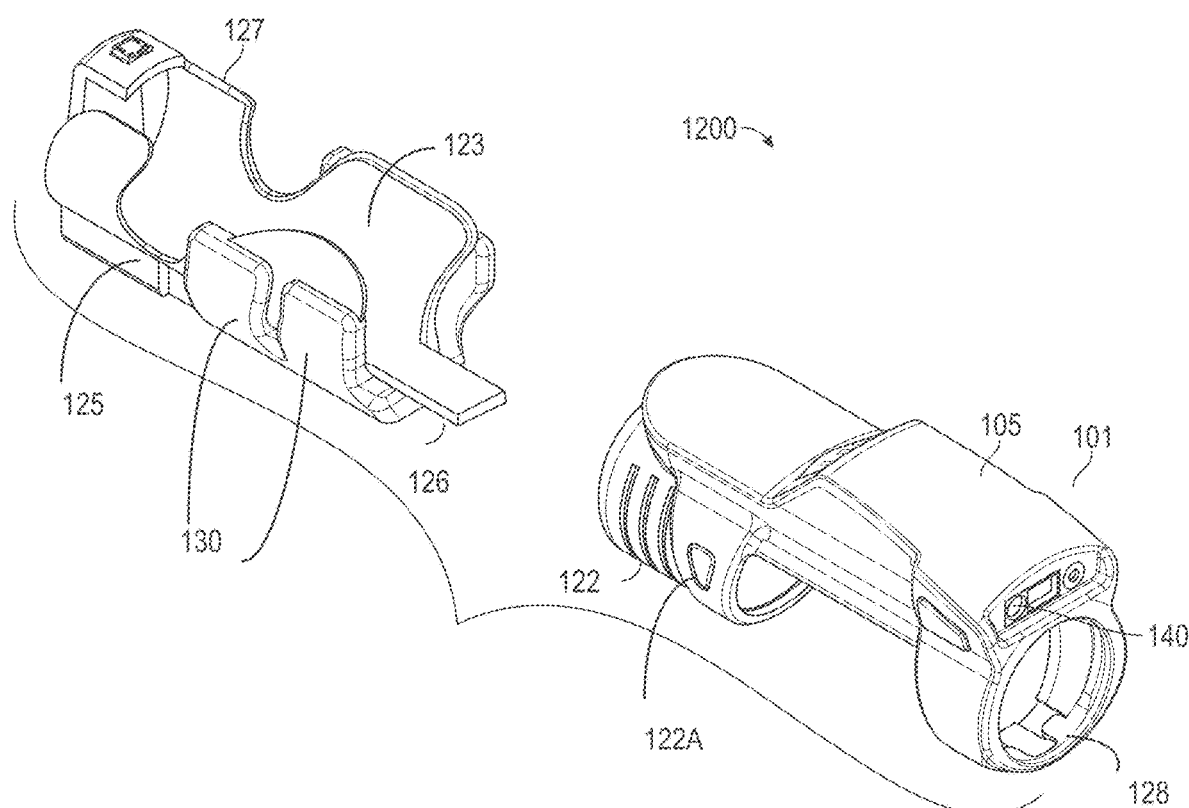
FIG. 12 shows an exploded view of a partial assembly of the real-time measurement and marking apparatus in accordance with an embodiment of the present disclosure.

In FIG. 12, 1200 shows a fully exploded view of the real time assembly FIG. 12 shows a fully exploded view of the full assembly of the real-time measurement and marking apparatus 1100 fully integrated with auxiliary components in accordance with an alternative embodiment of the present disclosure. More specifically, FIG. 12, 1200 shows an isometric exploded view of the real-time measurement and marking apparatus 1100 which shows the side of the real-time measurement and marking apparatus 1100. The embodiment shown in FIG. 12 is differentiated from FIG. 9 as the embodiment in FIG. 12 does not include the spray can 120.

Figure 16:
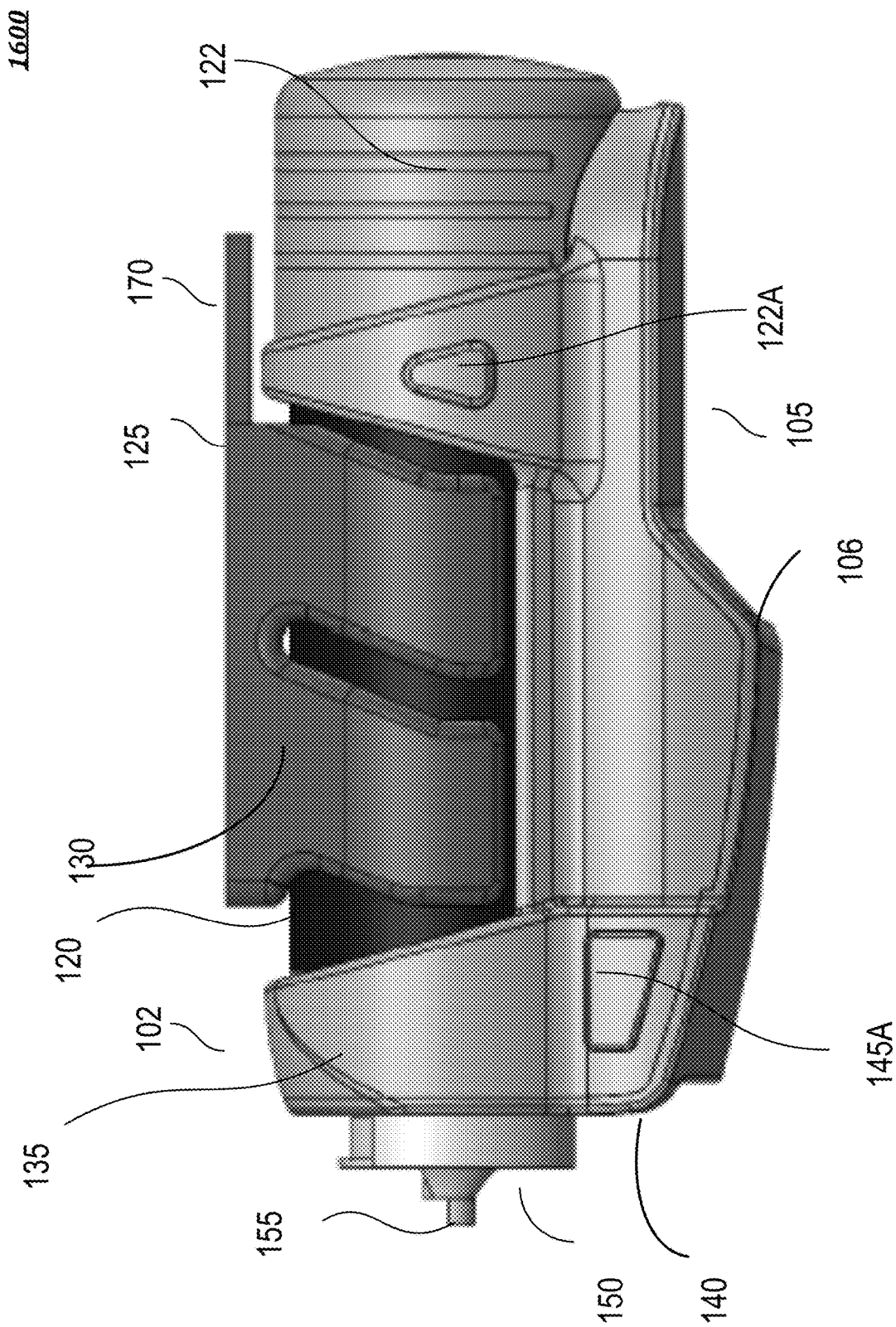
FIG. 16 shows a side view of the real-time measurement and marking apparatus in accordance with an alternative embodiment of the present disclosure.

In FIG. 16, 1600 shows an alternative embodiment of the real-time measurement and marking apparatus 1100 fully integrated with auxiliary components. In particular 16 shows an embodiment where the spray can bracket 125 has a different configuration. For example, foe spray can bracket 125 may not include a rear member that engages the rear portion of the cover 122. In addition, 1600 shows some of the multiple components of the full, assembly real-time measurement and marking apparatus as follows: a cover 122, a main housing 105, a foam spray can 120, a spray nozzle button 150, a spray nozzle aperture 155, clip mounting channel 170, range reading button 115, a laser range finder 140, a display 110, a spray can bracket 125, a bracket side grip 130, housing squeeze points 135, a activation button 145A, and a bottom surface 165 of the mam housing. The main housing 105 can also comprise a cover release button 122A, The cover release button 122A can be pressed to disengage the housing 101 from the spray can 120. In at least one aspect, the clip mounting channel 170 may engage clip assembly 138 (clip assembly shown in FIG. 8).

In one or more embodiments, the real-time measurement and marking apparatus 1100 comprises a computer or one or more electrical components. The one or more electrical components of real-time measurement and marking apparatus 1100 may comprise a laser measuring module configured to interface with the at least one controller secondary configured to allow a laser measuring module to measure the distance. The at least one controller further configured to perform comprehensive tasks including but not limited to time tracking, data logging, receiving user input, transmitting and receiving data, use of various communication media including wired networks, BLUETOOTH® technology, WIFI® networks, wireless networks, telecommunication networks, and other network communication means, satellite communication and radio. The at least one controller further configured such that it can be updated and enhanced for future devices to have additional functions. A mini USB port 145B and an activation button 145A configured to function as a permanent power on/off switch are found on the real-time measurement and marking apparatus 1100. The measuring function may be activated by pressing a thumb activated range reading button 115 below the display 110 wherein the display 110 may be configured as a seven segment Liquid Crystal Display (LCD) readout. The real-time measurement and marking apparatus 1100 may be configured to function in full daylight as well as shade and a mixture of both. In one or more embodiments, the real-time measurement and marking apparatus 1100 may function in a night time stadium game with appropriate lighting.

As discuss earlier, the optical measuring apparatus can comprise a laser range finder 140. The laser range finder can be configured to emit a single laser or a plurality of lasers. The laser range finder can emit the laser towards a target. Once the laser, contracts the target, a portion of the beam will reflect back two wards the laser range finder. The controller can also be in communication with the laser range finder to further refine or adjust calculations. For example, the laser range finder can toggle between metric and standard units depending on the use.

During use, the time difference between the laser emission and laser reception by the laser range finder 140 can be used to determine the distance. To account for different atmospheric or environmental conditions, another embodiment of the laser range finder 140 can be configured to emit and receive a plurality of lasers. The laser range finder 140 can be configured to use the measurement data from all of the lasers emitted to increase the accuracy of the distance calculation. In one aspect, a first laser can be a red laser (wavelength=650 nm); a second laser can be a blue laser (wavelength=450 nm); and a third laser can be third laser can be a green laser (wavelength=532 nm).

Advantages and Benefits

In contemporary football or soccer gameplay, currently, a soccer referee may walk out an approximated ten-yard distance for placement of a free kick. However, in actuality, the referee never exactly marks off ten-yards. This can change the outcome of a game instantly by unfairly providing an advantage to one opponent over another. Accurate placement of free kicks in today's modern game been a specialty tactic and represents fifty percent outcomes of high-level matches. Research and statistics show referees are more likely to be less than ten-yards at least fifty percent of the time. The rules of football read "Until the ball is in play all opponents must remain: at least 9.15 m (10 yds) from the ball, unless they are on their own goal line between the goalposts outside the penalty area for free kicks inside the opponents' penalty area."[1] Based on the research, when the official placed a free kick from a distance of twenty-five plus yards or more from the goal, the average walked out distance was between nine and ten yards. Furthermore, when the official placed a free kick from a distance between twenty to twenty-five yards (just outside the penalty box and directly in front of goal), the average walked out distance was between eight to ten yards where defenders in the wall are lined up in the penalty box. Moreover, when the official placed a free kick from a distance between twenty to twenty-five yards outside the penalty box and at an angle (i.e., corner of penalty box either left or right side), the average walked out distance was between seven to ten yards.

[1] http://www.theifab.com/laws/free-kicks-2018/chapters/procedure-2018

When vanishing spray is not used by the officials, the defenders in the wall, breach the final standing (do not move position) by one to twelve inches, ninety percent of the time. When spray is not used, the ball is either repositioned in any direction by the free kick taker and mostly moved sideways or forward by one to thirty-six inches ninety percent of the time.

The present disclosure offers numerous advantages and solutions to the aforementioned problems. For example, in bad weather where visibility seeing the ball is compromised or wind affects position of the ball, the apparatus can accurately measure exact distances. This increases the accuracy and precision of the free kicks.

There is an improved simplicity of use in addition to a lack of inconvenience for the official. For example, the addition of the laser measuring device on the can, which the referee already carries, does not change the weight of can by more than one ounce. The apparatus may be powered by a small lithium battery.

There is added advantage of using the apparatus. For example, the difference between the existing spray can that's currently used, and the apparatus is the existing version only has one use. To spray the grass where the referee has walked out 10 yards. The current apparatus measures the exact distance to within 0.005% accuracy.

Furthermore, the apparatus provides legitimacy to the distances marked by gaming officials. For example, in the world of competing football where more and more players are competing from hundreds of countries worldwide the laser can is the only product that legitimizes exact distances. Forty-eight teams will qualify for World Cup 2020. The stakes are huge. The current system and apparatus can level the playing field.

Methods for Using the Devices and Systems

The present disclosure, according to further aspects, also provides methods of using the disclosed devices and systems. In one aspect, disclosed herein is a method for using the real-time measurement and marking apparatus.

Figure 14:
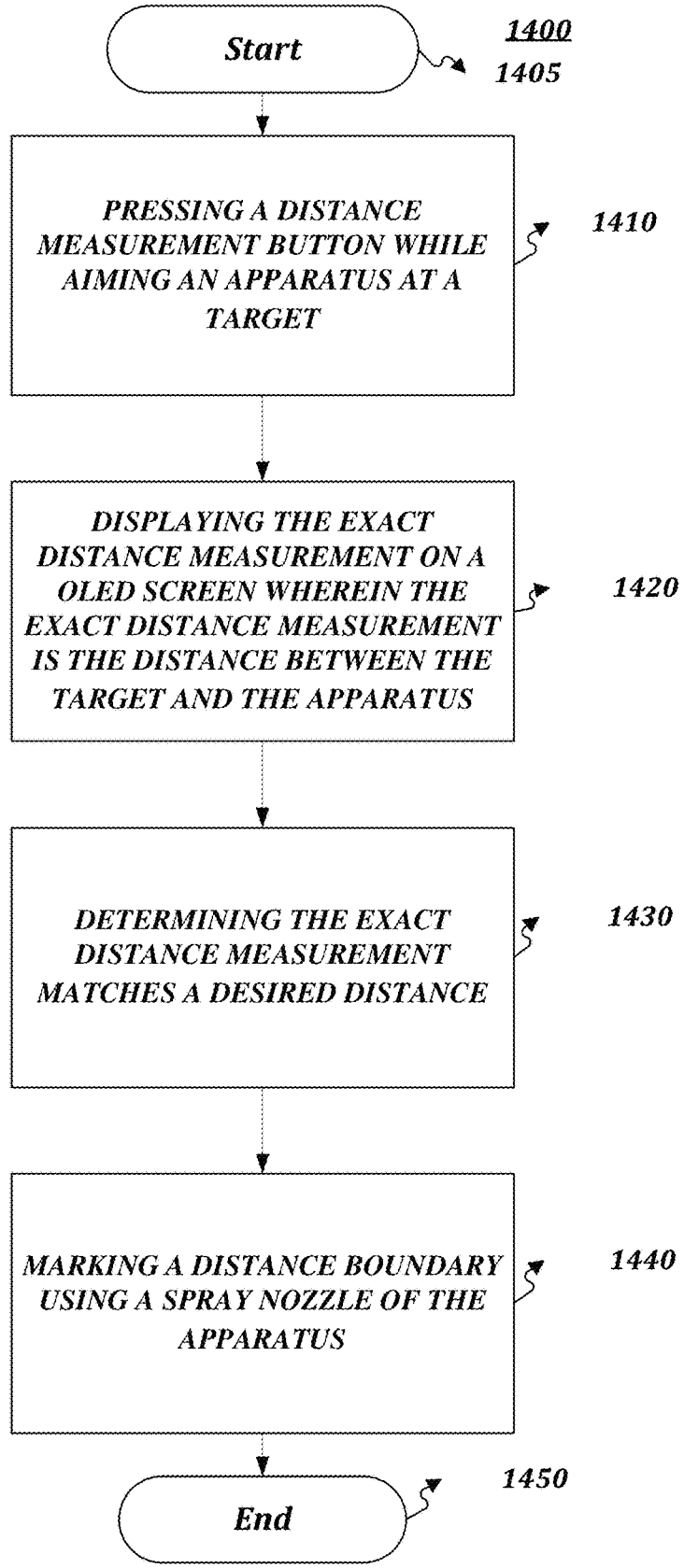
FIG. 14 is a flow chart of a method for using the real-time measurement and marking apparatus in accordance with an embodiment of the present disclosure.

FIG. 14 is a flow chart of a method for using the real-time measurement and marking apparatus in accordance with an embodiment of the present disclosure. FIG. 14 is a flow chart setting forth the general stages involved in a method 1400 consistent with an embodiment of the disclosure for providing the Real-time measurement and marking apparatus in accordance with an embodiment of the present disclosure. Although method 1400 has been described to be performed by a first user, it should be understood that any number of users may be used to perform the various stages of method 1400. Furthermore, in some embodiments, different operations may be performed by different users in operative communication with a first user.

Scenarios of Use

The real-time measurement and marking apparatus may be used in one or more various scenarios in accordance with one or more embodiments of the present disclosure. For example, the real-time measurement and marking apparatus may be used After blowing whistle to stop play due to a foul, the game official (i.e., referee) must position the football (i.e., soccer ball, or game ball) where the foul was committed.

The game ball remains in its stationary position of placement as the referee walks out 10-yards and then points the real-time measurement and marking apparatus at the game ball.

Upon pressing a trigger (power switch), a laser from the real-time measurement and marking apparatus may be used to shine a sharp red laser marker on the stationary game ball. A display from the real-time measurement and marking apparatus may provide a display reading (including but not limited to a backlit display panel, an LED (light emitting diode) digital numerical display read out, or other visual display) on the real-time measurement and marking apparatus which provides the exact distance between the real-time measurement and marking apparatus and the game ball.

Accurate data measurement provided in real-time allows a game official to reposition until the moment when the official moves to exactly the position where 10-yards is measured on the LED read out. In one or more embodiments, a second laser marker on the bottom of the real-time measurement and marking apparatus may be used (at 90 degrees) to shine directly on the pitch between the referee's feet which may establish an exact 10-yard end position.

The official may squeeze the spray nozzle of the real-time measurement and marking apparatus which may be used to release marking spray from the bottom of the real-time measurement and marking apparatus along the line of the laser and forms a visible line on the playing field. This line marks the 10-yard position where the defenders on the playing field must stand behind.

A method for using the real-time measurement and marking apparatus:
A. pressing a distance measurement button while aiming an apparatus at a target;
B. displaying an exact distance measurement on a LED screen wherein the exact distance measurement is the distance between the target and the apparatus;
C. determining the exact distance measurement matches a desired distance; and
D. marking a distance boundary using a spray nozzle of the apparatus.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 1400 will be described in greater detail below.

Method 1400 may begin at starting block 1405 and proceed to stage 1410 where a user may press a distance measurement button while aiming an apparatus at a target. For example, a football referee may press the apparatus while aiming a football on a sporting field when measuring a free kick placement.

From stage 1410, where a user presses a distance measurement button while aiming an apparatus at a target, method 1400 may advance to stage 1420 where the apparatus displays an exact distance measurement on a LED screen wherein the exact distance measurement is the distance between the target and the apparatus. For example, a football referee may read a "10 yards" measurement on the display screen of the apparatus while measuring a free kick placement.

Once the apparatus displays an exact distance measurement on a LED screen wherein the exact distance measurement is the distance between the target and the apparatus in stage 1420, method 1400 may continue to stage 1430 where a user determines whether the exact distance measurement matches a desired distance. For example, a football referee may determine whether the displayed measurement on the display screen of the apparatus matches the required distance such as ten yards for a free kick placement.

After a user determines whether the exact distance measurement matches a desired distance in stage 1430, method 1400 may proceed to stage 1440 where a user marks a distance boundary using a spray nozzle of the apparatus. For example, a football referee may press the spray nozzle of the apparatus on a sporting field when measuring a free kick placement in stage 1440, method 1400 may then end at stage 1450.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Figure 15:
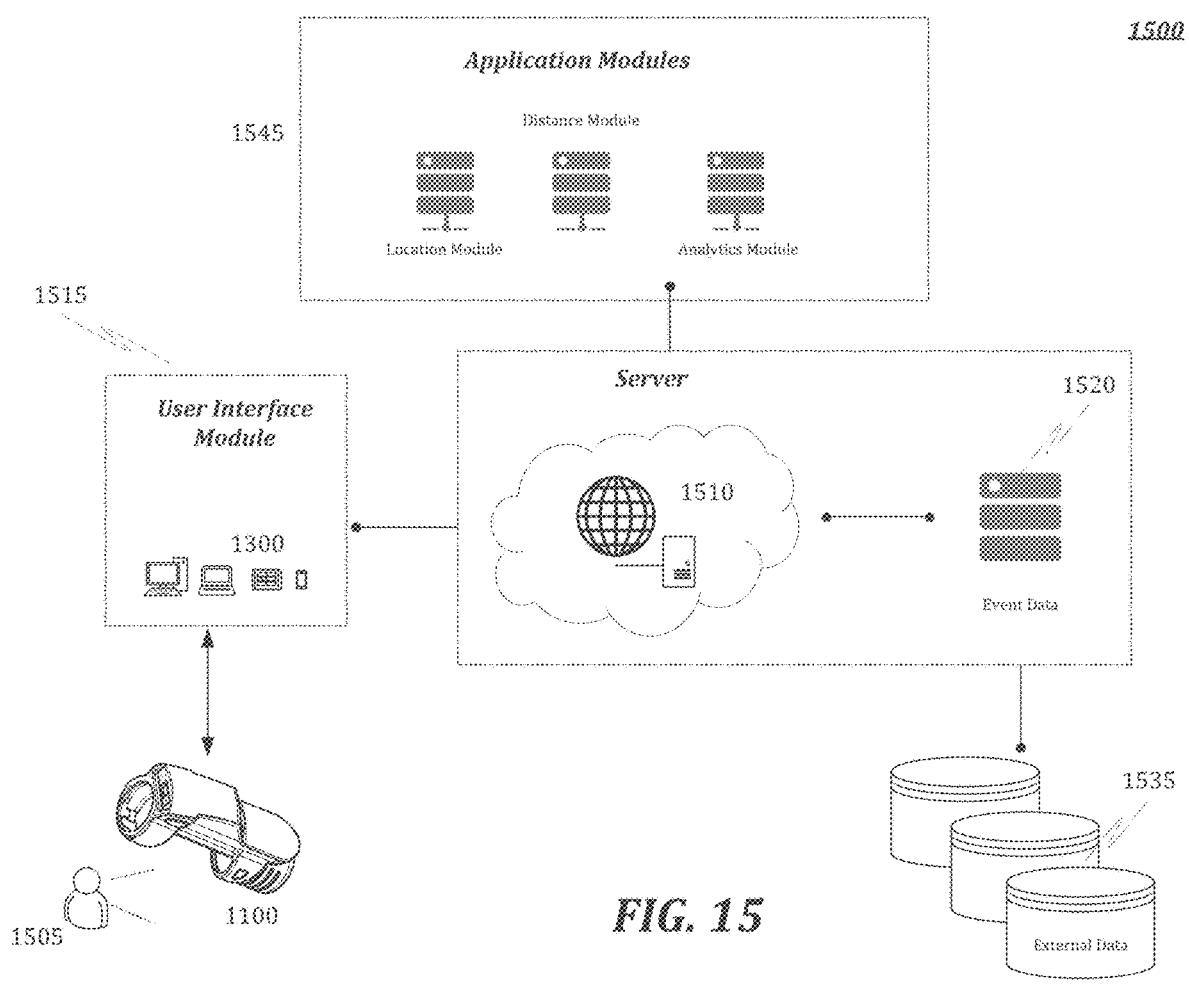
FIG. 15 shows the operating environment for the real-time measurement and marking apparatus in accordance with an embodiment of the present disclosure.

FIG. 15 illustrates a system diagram of an operating environment consistent with the present disclosure. FIG. 15 illustrates one possible operating environment through which a platform consistent with embodiments of the present disclosure may be provided. By way of non-limiting example, FIG. 15 shows the operating environment for the real-time measurement and marking apparatus in accordance with an embodiment of the present disclosure. The real-time measurement and marking apparatus may further comprise GPS and other chip technologies are also embedded in the apparatus. Moreover, the disclosed real-time measurement and marking apparatus may be configured to record product usage and other metrics is available via USB to an IBLC™ software platform. The software platform may be configured such that referees will be able to upload analytical data recorded during a game to IBLC™ software and various third-party organizations and referee associations. The information gathered on every usage will be used in a long-term study.

With regards to FIG. 15, a user 1505 utilizes the real-time measurement and marking apparatus which is operatively coupled to a user interface module 1515. The user interface module 1515 may be implemented by one or more computing devices 1300 wherein the one or more computing devices may be a smartphone, tablet, personal computer, or laptop computer. In at least one aspect, the user interlace module 1515 may be part of display 110 whereby the display 110 comprises an organic light-emitting diode (OLED), light emitting diode (LED), liquid crystal display (LCD), and other display apparatus configured to provide at least one of a touchscreen interface, a touch panel interface, and interface panel. In yet another aspect, the user interface module 1515 may be configured to be backlit, independently powered, or powered by the power supply of real-time measurement and marking apparatus 1100. The real-time measurement and marking apparatus 1100 may be connected to a number of application modules 1525 (i.e., Location Module, Distance Module, and Analytics Module); a server 1510, The server storing information at an event data storage location 1520. Additional information may be stored in another location with external data 1535.

The platform 1500 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 1500 may be hosted on a centralized server, such as, for example, a cloud computing service. Although method 1400 has been described to be performed by a computing device 1300, it should be understood that, in some embodiments, different operations may be performed by different networked elements in operative communication with computing device 1300.

Embodiments of the present disclosure may comprise a system having a memory storage and a processing unit. The processing unit coupled to the memory storage, wherein the processing unit is configured to perform the stages of method 1400.

Figure 13:
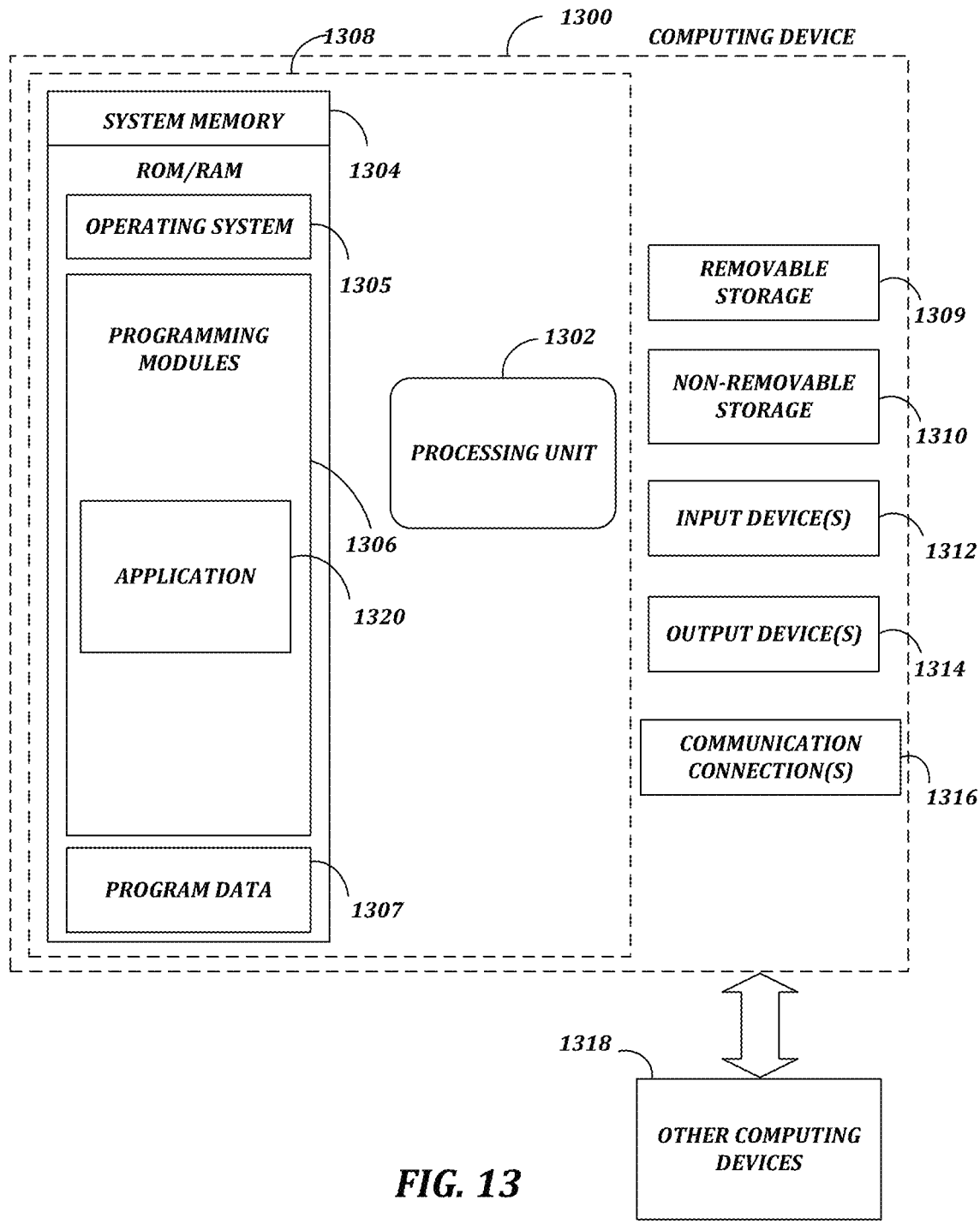
FIG. 13 is a block diagram of a system including a computing device for performing the method of FIG. 14.

FIG. 13 is a block diagram of a system including a computing device 1300 for performing the method of FIG. 14.

Consistent with an embodiment of the disclosure, the aforementioned memory storage and processing unit may be implemented in a computing device, such as computing device 1300 of FIG. 13. Any suitable combination of hardware, software, or firmware may be used to implement the memory storage and processing unit. For example, the memory storage and processing unit may be implemented with computing device 1300 or any of other computing devices 1318, in combination with computing device 1300. The aforementioned system, device, and processors are examples and other systems, devices, and processors may comprise the aforementioned memory storage and processing unit, consistent with embodiments of the disclosure.

With reference to FIG. 13, a system consistent with an embodiment of the disclosure may include a computing device, such as computing device 1300. In a basic configuration, computing device 1300 may include at least one processing unit 1302 and a system memory 1304. Depending on the configuration and type of computing device, system memory 1304 may comprise, but is not limited to, volatile (e.g., random access memory (RAM)), non-volatile (e.g., read-only memory (ROM)), flash memory, or any combination. System memory 1204 may include operating system 1305, one or more programming modules 1306, and may include a program data 1307. Operating system 1305, for example, may be suitable for controlling computing device 1300's operation. In one embodiment, programming modules 1306 may include a user interface module, a location module, an analytics module, and additional programming modules that could enable the disclosure, for example application modules 1320. Furthermore, embodiments of the disclosure may be practiced in conjunction with a graphics library, other operating systems, or any other application program and is not limited to any particular application or system. This basic configuration is illustrated in FIG. 13 by those components within a dashed line 1308. In one aspect, a system consistent with an embodiment of the disclosure such as computing device 1300 may be further comprise a printed circuit board (pcb), a memory, a computing device, a transmitter, a receiver, and a socket on chip (SoC) configured for processing data. In another aspect, the system consistent with an embodiment of the disclosure such as computing device 1300 may be a socket on chip (SoC) device. In another aspect, the system consistent with an embodiment of the disclosure such as computing device 1300 may be a printed circuit board (pcb).

Computing device 1300 may have additional features or functionality. For example, computing device 1200 may also include additional data storage devices (removable and/or non-removable) such as, for example, magnetic disks, optical disks, or tape. Such additional storage is illustrated in FIG. 13 by a removable storage 1309 and a non-removable storage 1310. Computer storage media may include volatile and nonvolatile, removable and non-removable media implemented in any method or technology for storage of information, such as computer readable instructions, data structures, program modules, or other data. System memory 1304, removable storage 1309, and non-removable storage 1310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1300. Any such computer storage media may be part of device 1300. Computing device 1300 may also have input device(s) 1312 such as a keyboard, a mouse, a pen, a sound input device, a touch input device, etc. Output device(s) 1314 such as a display, speakers, a printer, etc. may also be included. The aforementioned devices are examples and others may be used.

Computing device 1300 may also contain a communication connection 1316 that may allow device 1300 to communicate with other computing devices 1318, such as over a network in a distributed computing environment, for example, an intranet or the Internet. Communication connection 1316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1304, including operating system 1305. While executing on processing unit 1302, programming modules 1306 (e.g., a user interface module, a location module, an analytics module, and additional programming modules that could enable the disclosure, for example application modules 1320) may perform processes including, for example, one or more of method 1400's stages as described above. The aforementioned process is an example, and processing unit 1302 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and quantum computing elements. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior disclosure. Further, the dates of publication provided herein can be different from the actual publication dates, which can require independent confirmation.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

The following is claimed:

1. A portable marking device comprising:
   a housing including a main housing structure and a spray can cover, the main housing structure comprising a housing groove located at a bottom inner surface of the main housing structure, wherein the main housing structure comprises a front open end configured to receive a nozzle end of the spray can, a rear end configured to hold a back end of the spray can, a top surface, a bottom surface, and a pair of opposing rounded side walls defining an aperture for placement of the spray can,
   the spray can cover having a rear open end, a front closed end, at least one portion of the spray can cover extending at the rear open end to selectively engage with the aperture defined by at least one of the side walls, wherein the spray can cover is configured to cover a portion of the spray can for releasably securing the spray can within the housing;
   a nozzle member positioned at the rear nozzle end of the main housing structure, the nozzle member having a spray aperture and a spray nozzle button configured to dispense a marking material from the spray can through the spray aperture;
   an optical measuring apparatus contained within the main housing structure and configured to measure a distance between a point of focus and the portable marking device;
   a housing guard disposed over the optical measuring apparatus;
   a spray can bracket comprising a bracket top surface, bracket bottom surface, and a bracket side surface; and
   a bracket sleeve comprising a curved surface wherein the bracket sleeve is oriented to couple inside the spray can bracket at the bracket top surface,
   wherein:
   the optical measuring apparatus comprises a range finder disposed on a surface at the rear nozzle end above the nozzle member; and
   the bracket sleeve comprises a sleeve coupling member configured to engage the housing groove.

2. The portable marking device of claim 1, further comprising a range measurement button disposed on the top surface of the main housing structure for activating real-time measuring by the optical measuring apparatus, and a measurement display screen positioned on a front face of the main housing structure above the range measurement button.

3. The portable marking device of claim 2, wherein the portable marking device is configured to perform real-time measuring when a user aims the range finder at the point of focus and activates the optical measuring apparatus to obtain a real-time measurement of distance; and wherein the portable marking device is further configured to display the real-time measurement on the measurement display screen.

4. The portable marking device of claim 1, wherein the optical measuring apparatus is configured to transmit a first laser on the point of focus for obtaining a real-time measurement of the distance to the point of focus.

5. The portable marking device of claim 4, wherein the optical measuring apparatus is configured to transmit a second laser on the point of focus, wherein the optical measuring apparatus is further configured to determine the real-time measurement based on a first measurement of the first laser and a second measurement of the second laser.

6. The portable marking device of claim 1, wherein the portable marking device further comprises a universal serial bus (USB) port and a controller configured to interface with the optical measuring apparatus.

7. The portable marking device of claim 6, wherein the controller is further configured to perform time tracking, perform data logging, receive user input, and transmit and receive data.

8. The portable marking device of claim 7, further comprising a memory, a computing device, a transmitter, and a receiver.

9. The portable marking device of claim 7, further comprising a motor electronically coupled to the controller.

10. The portable marking device of claim 3, wherein the measurement display screen is further configured to display a power level indicator.

11. The portable marking device of claim 9, wherein the housing is manufactured from injected molded plastic selected from the group consisting of acrylonitrile butadiene styrene (ABS), polycarbonate alloy (PC), and a combination thereof.

12. The portable marking device of claim 1, wherein the real-time measurement of distance is within 0.005% accuracy.

13. A portable marking device comprising:
a housing including a main housing structure and a spray can cover, the main housing structure comprising a housing groove located at a bottom inner surface of the main housing structure, wherein, the main housing structure comprises a front open end configured to receive a nozzle end of the spray can, a rear end configured to hold a back end of the spray can, a top surface, a bottom surface, and a pair of opposing rounded side walls defining an aperture for placement of the spray can,
the spray can cover having a rear open end, a front closed end, at least one portion of the can cover extending at the rear open end to selectively engage with the aperture defined by at least one of the side walls, wherein the spray can cover is configured to cover a portion of the spray can for releasably securing the spray can within the housing;
a nozzle member positioned at the rear nozzle end of the main housing structure, the nozzle member having a spray aperture and a spray nozzle button configured to dispense a marking material from the spray can through the spray aperture;
an optical measuring apparatus contained within the main housing structure for real-time measuring of a distance between a point of focus and the portable marking device;
a housing guard disposed over the optical measuring apparatus;
a spray can bracket comprising a bracket top surface, bracket bottom surface, and a bracket side surface; and
a bracket sleeve comprising: a curved surface and a front end wherein the curved surface is oriented to couple inside the bracket top surface, and
a sleeve coupling member located at a front end of the bracket sleeve,
wherein:
the optical measuring apparatus comprises a range finder disposed on a surface at the rear nozzle end above the nozzle member; and
the sleeve coupling member is configured to engage the housing groove.

14. The portable marking device of claim 13, wherein the spray can bracket comprises a U-shape defined by at least one set of protrusions extending from the bracket side surface of the spray can bracket, wherein protrusions extend in a curved profile to mirror the external surface area of a spray can, wherein the spray can bracket further defines a mounting channel.

15. The portable marking device of claim 13, wherein the optical measuring apparatus further comprises a multifunction button configured to: activate the power on the optical measuring apparatus, initiate the optical measuring of a distance, and send the distance to a measurement display screen.

16. The portable marking device of claim 15, further comprising a mounting clip wherein a first portion of the mounting clip is configured to engage a mounting channel and a second portion of the mounting clip is configured to engage a portion defined by a user with a clip assembly.

17. The portable marking device of claim 8, wherein the measurement data is communicated between an external computing device or external application via the transmitter and the receiver.

18. The portable marking device of claim 8, wherein the computing device comprises a GPS, wherein the real time position of the portable marking device can be determined.

19. An apparatus comprising:
a housing including a main housing structure and a spray can cover, the main housing structure comprises a front open end configured to receive a nozzle end of the spray can, a rear end configured to hold a back end of the spray can, a top surface, a bottom surface, and a pair of opposing rounded side walls defining an aperture for placement of the spray can,
the spray can cover having a rear open end, a front closed end, at least one portion of the can cover extending at the rear open end to selectively engage with the aperture defined by at least one of the side walls, wherein the spray can cover is configured to cover a portion of the spray can for releasably securing the spray can within the housing;
a nozzle member positioned at the rear nozzle end of the main housing structure, the nozzle member having a spray aperture and a spray nozzle button configured to dispense a marking material from the spray can through the spray aperture;
an optical measuring apparatus contained within the main housing structure for real-time measuring of a distance between a point of focus and the apparatus;
a bracket sleeve having a front portion and a rear portion; and
a mounting bracket coupled to the rear portion of the bracket sleeve,
wherein:
the optical measuring apparatus comprises a range finder disposed on a surface at the rear nozzle end above the nozzle member; and
the bracket sleeve is configured to engage the main housing structure.

20. The apparatus of claim 19, the apparatus further comprising:
a sleeve coupling member coupled to the front portion of the bracket sleeve; and a housing groove configured to receptively engage the sleeve coupling member.

* * * * *